(12) United States Patent
Cvjeticanin et al.

(10) Patent No.: US 8,419,359 B2
(45) Date of Patent: *Apr. 16, 2013

(54) PLASTIC COMPRESSOR HOUSING AND METHOD FOR PRODUCING A PLASTIC COMPRESSOR HOUSING

(75) Inventors: Nenad Cvjeticanin, Frankfurt (DE); Uwe Ludwig, Bad Soden-Salmuenster (DE)

(73) Assignee: WOCO Industrietechnik GmbH, Bad Soden-Salmuenster (DE)

( * ) Notice: Subject to any disclaimer, the term of this patent is extended or adjusted under 35 U.S.C. 154(b) by 1230 days.

This patent is subject to a terminal disclaimer.

(21) Appl. No.: 12/137,500

(22) Filed: Jun. 11, 2008

(65) Prior Publication Data

US 2008/0304960 A1 Dec. 11, 2008

(30) Foreign Application Priority Data

Jun. 11, 2007 (DE) .......................... 10 2007 027 282

(51) Int. Cl.
*F04D 29/42* (2006.01)
(52) U.S. Cl.
USPC .......................... 415/200; 415/215.1; 415/206
(58) Field of Classification Search .................. 415/915, 415/200, 212.1, 215.1, 224, 232, 204, 206, 415/207
See application file for complete search history.

(56) References Cited

U.S. PATENT DOCUMENTS

| 1,467,254 | A | 9/1923 | Tarbet |
| 3,429,605 | A | 2/1969 | Soesbergen |
| 4,867,641 | A | 9/1989 | Okuno |
| 5,209,461 | A | 5/1993 | Whightsil, Sr. |
| 5,219,461 | A | 6/1993 | Hyll |

(Continued)

FOREIGN PATENT DOCUMENTS

| DE | 27 06 110 A1 | 8/1978 |
| DE | 34 24 661 A1 | 1/1986 |

(Continued)

OTHER PUBLICATIONS

European Search Report dated Dec. 6, 2007, in European Application No. EP 07 00 4322, filed Mar. 7, 2007, corresponding to U.S. Publication No. 2007/0199727, published Aug. 30, 2007, 2 pages.

(Continued)

*Primary Examiner* — Nathaniel Wiehe
*Assistant Examiner* — Adam W Brown
(74) *Attorney, Agent, or Firm* — Christensen O'Connor Johnson Kindness PLLC

(57) ABSTRACT

A plastic compressor housing, in particular a radial compressor housing, preferably for a turbocharger, includes at least one first housing part and at least one second housing part, which respectively comprise at least in some areas at least one thermoset material. The first housing part and/or the second housing part comprises or comprise at least two individual elements, wherein the first housing part and the second housing part are coated at least in some areas with at least one thermoset body or at least one thermoplastic body such that the first housing part, the second housing part and the individual elements of the first housing part and/or the second housing part respectively are in contact at least in some areas with the thermoset body or the thermoplastic body. Also disclosed is a method for producing a plastic compressor housing and a turbocharger.

36 Claims, 12 Drawing Sheets

U.S. PATENT DOCUMENTS

| | | | |
|---|---|---|---|
| 5,257,904 | A | 11/1993 | Sullivan |
| 5,711,652 | A | 1/1998 | van de Venne |
| 5,989,664 | A | 11/1999 | Takayama |
| 6,193,463 | B1 * | 2/2001 | Adeff et al. .................... 415/196 |
| 6,428,288 | B1 | 8/2002 | King |
| 6,652,222 | B1 | 11/2003 | Wojtyczka |
| 6,823,624 | B2 | 11/2004 | Proserpio |
| 7,086,833 | B2 * | 8/2006 | Cvjeticanin et al. ........ 415/215.1 |
| 7,478,532 | B2 * | 1/2009 | Martin et al. ................. 60/605.1 |
| 2004/0018102 | A1 | 1/2004 | Wand |
| 2004/0145095 | A1 * | 7/2004 | McCollum et al. ............ 264/544 |
| 2006/0185363 | A1 * | 8/2006 | Gustafson et al. .............. 60/599 |
| 2006/0201135 | A1 | 9/2006 | Xie |
| 2007/0020084 | A1 | 1/2007 | Krines |
| 2007/0081887 | A1 | 4/2007 | Xie |
| 2007/0199727 | A1 | 8/2007 | Cvjeticanin |
| 2009/0053051 | A1 | 2/2009 | Cvjeticanin |
| 2009/0202379 | A1 | 8/2009 | Werner |

FOREIGN PATENT DOCUMENTS

| | | | |
|---|---|---|---|
| DE | 91 01 683 U1 | | 6/1992 |
| DE | 44 38 750 A1 | | 5/1996 |
| DE | 197 20 286 A1 | | 11/1998 |
| DE | 197 50 516 A1 | | 5/1999 |
| DE | 100 54 855 A1 | | 5/2002 |
| DE | 101 12 764 A1 | | 9/2002 |
| DE | 102 60 042 A1 | | 7/2004 |
| DE | 10103669 B4 * | | 7/2004 |
| DE | 103 14 209 B3 | | 12/2004 |
| DE | 10 2004 041 439 A1 | | 2/2006 |
| DE | 20 2004 019 366 U1 | | 5/2006 |
| DE | 10 2005 055 200 A1 | | 5/2007 |
| DE | 10 2006 010 461 B3 | | 10/2007 |
| DE | 10 2006 009 054 B4 | | 11/2007 |
| DE | 10 2007 009 781 A1 | | 8/2008 |
| DE | 10 2007 054 899 A1 | | 5/2009 |
| DE | 10 2008 008 981 A1 | | 8/2009 |
| EP | 0 166 940 A2 | | 1/1986 |
| EP | 0 499 191 A1 | | 8/1992 |
| EP | 1 188 544 A2 | | 3/2002 |
| EP | 1 674 671 A2 | | 6/2006 |
| EP | 1 830 071 B1 | | 12/2009 |
| GB | 2 281 941 A | | 3/1995 |
| JP | 55-118844 A | | 9/1980 |
| JP | 55-118845 A | | 9/1980 |
| JP | 58-056821 A | | 4/1983 |
| JP | 2000-205192 A | | 7/2000 |
| WO | 97/10439 A1 | | 3/1997 |
| WO | WO 9844249 A1 * | | 10/1998 |
| WO | 99/64747 A1 | | 12/1999 |

OTHER PUBLICATIONS

European Search Report dated Apr. 22, 2009, in corresponding European Application No. EP 08 01 0316, filed Jun. 6, 2008, 2 pages.

Hunold, D., et al., "Ingeniously Combined—Profitably Manufactured: Multi-Component Injection Moulding of Thermoplastics and Thermosets," Injection Moulding 91(3):39-41, Mar. 2001.

* cited by examiner

Fig. 7
Fig. 8
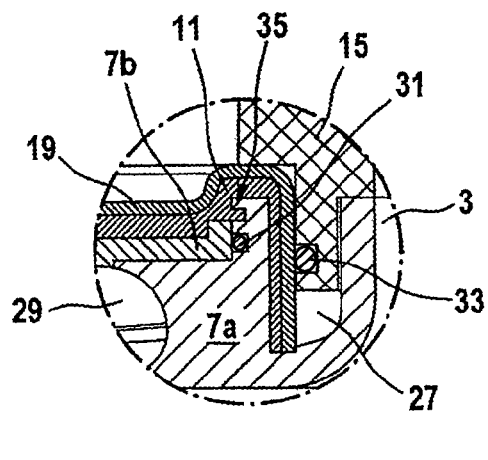
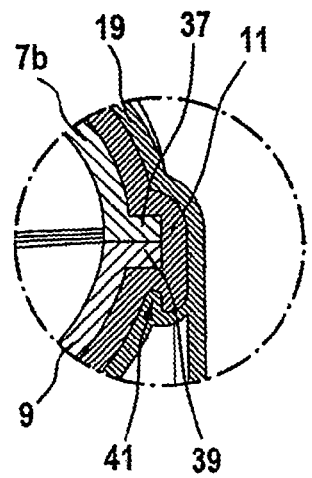
Fig. 9
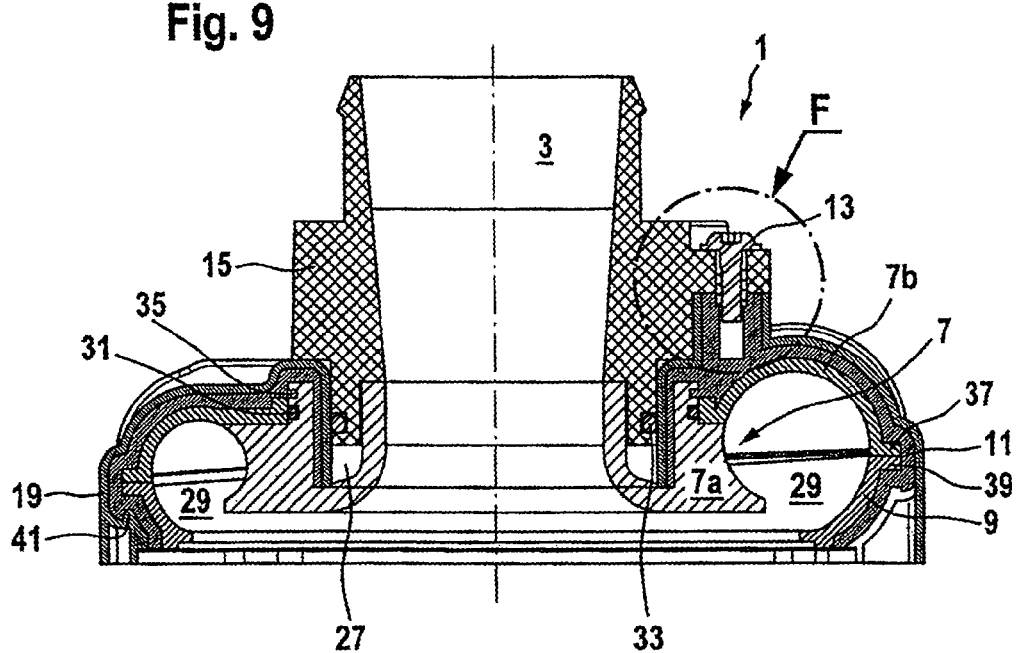

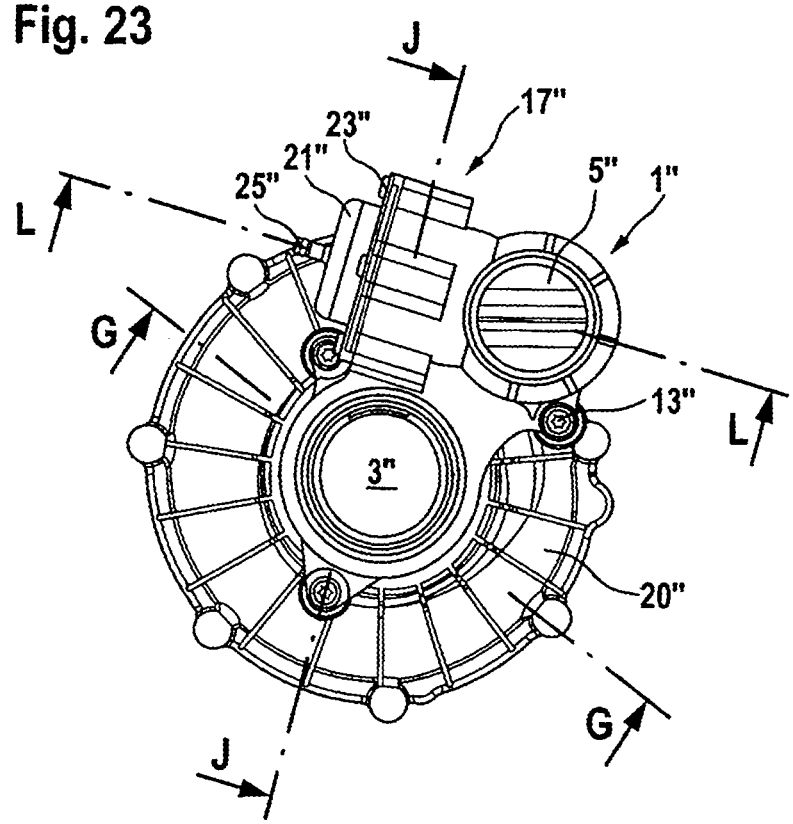
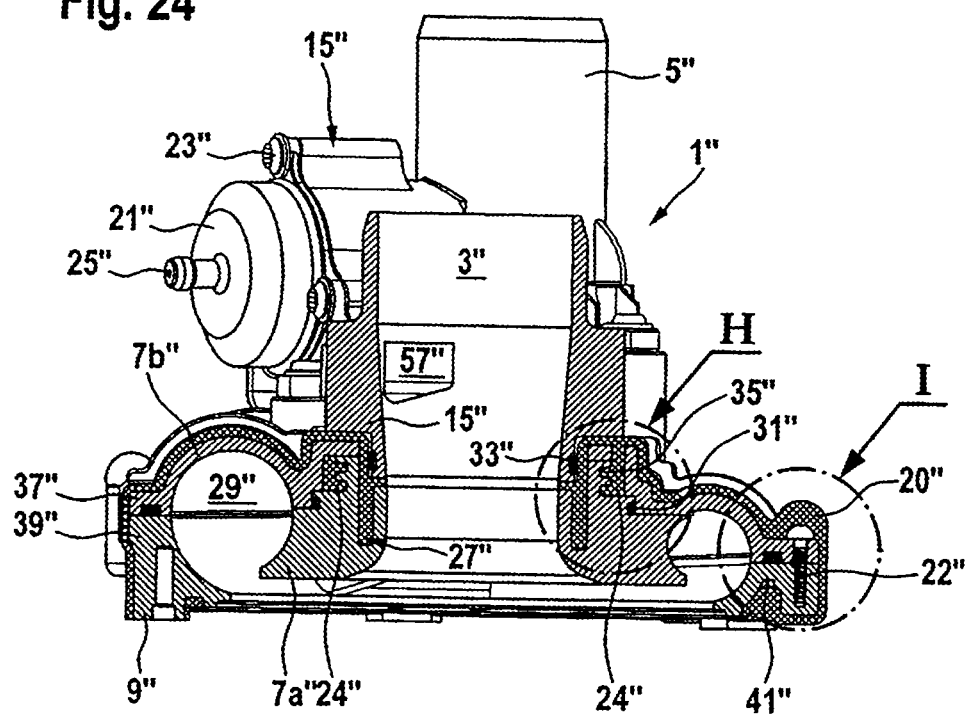

Fig. 25
Fig. 26
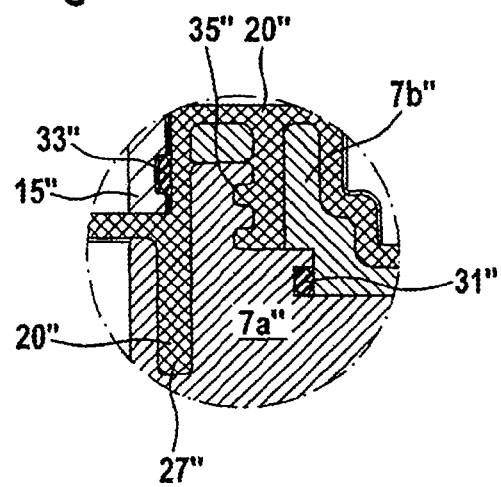
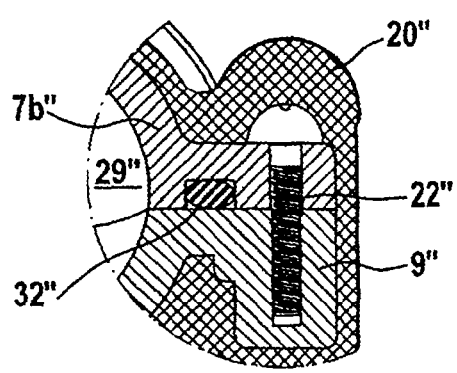
Fig. 27
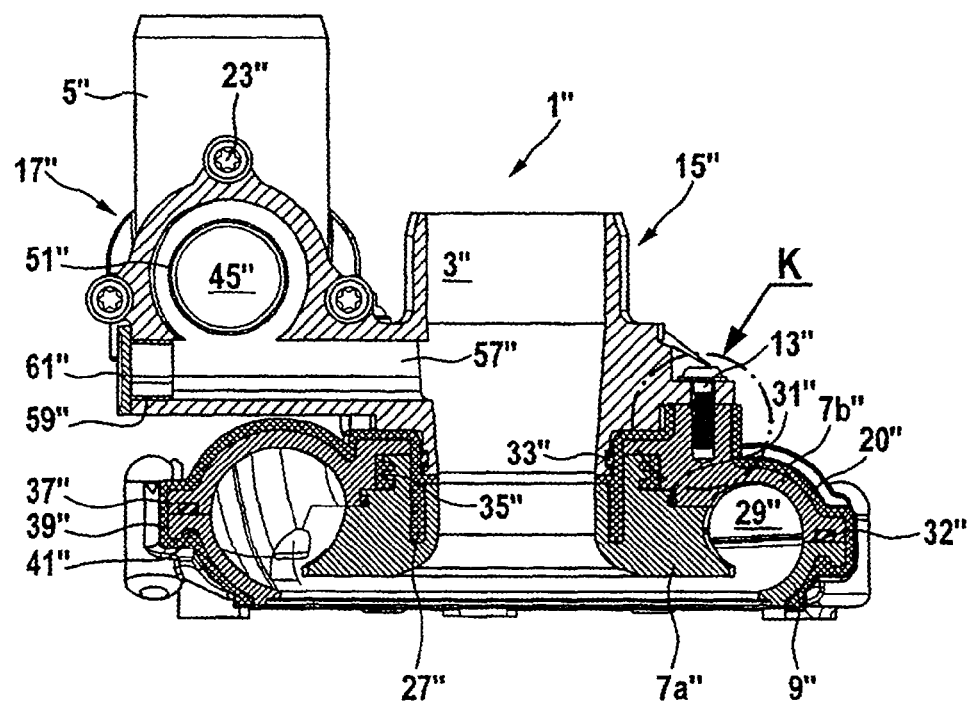

PLASTIC COMPRESSOR HOUSING AND METHOD FOR PRODUCING A PLASTIC COMPRESSOR HOUSING

INTRODUCTION

Disclosed herein is a plastic compressor housing, in particular a radial compressor housing, preferably for a turbocharger. At least one first housing part and at least one second housing part respectively comprise at least in some areas at least one thermoset material, wherein the first housing part and/or the second housing part comprises or comprise at least two individual elements. Further disclosed is a method for producing a plastic compressor housing, and a turbocharger comprising a plastic compressor housing.

BACKGROUND

Many different plastic compressor housings are known from the prior art.

For example, DE 103 14 209 B3 discloses a housing for a radial compressor and a method for manufacturing the housing. The housing comprises a first housing part that comprises two individual elements, each of which can be produced from a thermoset material. A first individual element can be firmly connected to a second individual element. To this end, the first individual element has a recess and/or at least one cavity to which a recess and/or a cavity in the second individual element can be assigned such that a cavity system is defined by the two individual elements firmly connected to one another, in which cavity system a flowable and solidifying composite material, such as an adhesive or a thermoplastic material, can be inserted to form a firm bond of the two individual elements. Although this housing has proven successful in principle, the geometry of the housing is limited to certain cross-sectional shapes. For example, when produced from a thermoset material, the individual elements are embodied in molds, wherein it is necessary for undercuts or the like to be omitted for demolding the individual elements.

To overcome these disadvantages, U.S. Pat. No. 6,193,463 B1 proposes a die cast housing for centrifugal compressors. The housing comprises two housing parts that are connected to one another via a threaded connection. A first housing part forms a rear wall, while a second housing part forms an upper shell. The second housing part is embodied in two pieces, wherein the cross-sectional geometry of the individual elements is embodied such that they can be shaped by means of a mold, wherein undercuts can be omitted. However, it is a disadvantage with this housing that, due to an inadequate securing of the individual elements to one another, it cannot withstand the extreme loads, such as those occurring in a turbocharger.

Furthermore, DE 102 60 042 A1 discloses a generic plastic compressor housing in the form of a turbocharger housing. The turbocharger housing has a compressor housing made of a thermoset material, which compressor housing is formed by a first housing part in the form of a compressor rear wall of a thermoset material and a second housing part in the form of a compressor front section, wherein the compressor front section is embodied by two individual elements in the form of an upper shell and a bearing shell. A connection between the upper shell and the bearing shell is achieved through an adhesive connection and/or a snap-on connection. It is likewise disadvantageous with this turbocharger housing that a detachment of the connection of the bearing shell from the upper shell may occur with the high loads that can occur within a turbocharger, so that, for example, a destruction of the housing occurs with a containment test, wherein the housing represents a potential threat of injuries and damage to objects and persons in the vicinity due to individual parts flying around.

BRIEF SUMMARY AND INITIAL DESCRIPTION

In at least one aspect, disclosed herein is a plastic compressor housing that renders possible a high component complexity, in particular with multiple undercuts, and that at the same time meets the highest demands in terms of stability and component safety. Furthermore, a method is provided for producing a plastic compressor housing and a turbocharger that overcome the disadvantages known from the prior art.

In at least one embodiment, the plastic compressor housing includes a first housing part and the second housing part that are coated at least in some areas with at least one thermoset body or at least one thermoplastic body such that the first housing part, the second housing part and the individual elements of the first housing part and/or the second housing part respectively are in contact at least in some areas with the thermoset body or the thermoplastic body.

It can thereby be provided in particular that the first housing part comprises at least one first individual element, preferably in the form of at least one first interior part, in particular one first interior part providing or limiting at least in part at least one helical internal contour and/or at least one compressor channel, and/or a second individual element, preferably in the form of at least one upper shell.

With the two aforementioned alternatives it can be provided that the second housing part comprises at least on third individual element, preferably in the in form of at least one second interior part, in particular one second interior part providing or limiting at least in part at least one helical internal contour and/or at least one compressor channel, and/or a fourth individual element, preferably in the form of at least one lower shell.

A preferred embodiment is characterized in that the first housing part, the second housing part and/or at least one individual element, in particular the first individual element, the second individual element, the third individual element and/or the fourth individual element, in particular on at least one first surface and/or in the area of at least one end edge, comprises or comprise at least one first anchoring element, wherein preferably at least one second surface of the first anchoring element is covered at least in some areas, in particularly completely, by the thermoset body or the thermoplastic body.

Furthermore, it is proposed that during the coating of the first housing part and of the second housing part with the thermoset body, the first housing part, the second housing part, at least one individual element, in particular the first individual element, the second individual element, the third individual element and/or the fourth individual element, the thermoplastic body and/or the thermoset body, at least in part, is or are covered by at least one thermoplastic in a hood-like manner.

It is also preferred that at least one second anchoring element is embodied on at least one third surface of the first housing part, of the second housing part, of at least one individual element, in particular of the first individual element, of the second individual element, of the third individual element and/or of the fourth individual element, and/or of the thermoset body, wherein preferably at least one fourth surface of the second anchoring element is covered at least in some areas, in particular completely, by the thermoplastic or the thermoplastic body.

It is also preferred for the plastic compressor housing that the first housing part, the second housing part, at least one individual element, in particular the first individual element, the second individual element, the third individual element and/or the fourth individual element, the thermoset body, the thermoplastic body and/or the thermoplastic at least in some areas provides or provide at least one fluid intake port, in particular air intake port, at least one compressor channel and/or at least in some areas at least one fluid outlet port, in particular air outlet port.

Furthermore, in accordance with an embodiment disclosed herein, at least one first fluid guide element, in particular comprising at least one fluid filter element, at least one line element, such as a fluid tube, and/or at least one damping element, such as a charge air damper, is covered at least in some areas by the thermoplastic body or the thermoplastic, which first fluid guide element is connectable to the fluid intake port, to the compressor channel and/or to the fluid outlet port, wherein preferably at least one third anchoring element is embodied on at least one fifth surface, in particular covered by the thermoplastic body or the thermoplastic at least in some areas, of the first fluid guide element, and/or at least one surface of the fluid intake port, of the compressor channel and/or of the fluid outlet port, in particular covered by the thermoplastic at least in some areas, forms the first surface.

With this embodiment it is preferably provided that the first fluid guide element comprises at least in some areas a plastic and/or a metal.

Furthermore, a plastic compressor housing can be characterized in that at least one first recess is embodied in the first housing part, the second housing part, at least one individual element, in particular the first individual element, the second individual element, the third individual element and/or the fourth individual element, and/or the thermoset body, wherein preferably at least one wall of the first recess, in particular one wall facing the compressor channel, is covered at least in some areas with the thermoplastic or the thermoplastic body.

With this embodiment it is preferred that the first recess is arranged at least in some areas adjacent to the compressor channel and/or at least in some areas between the compressor channel and the fluid intake port.

Furthermore, in accordance with an embodiment disclosed herein, the first housing part, the second housing part, at least one individual element, in particular the first individual element, the second individual element, the third individual element and/or the fourth individual element, the thermoset body, the thermoplastic, the thermoplastic body and/or the first fluid guide element is or are connectable to at least one third housing part.

With the latter alternative, it is also proposed that the first housing part, the second housing part, the third housing part at least in part comprises at least one functional component of the plastic compressor housing and/or of a compressor comprising the plastic compressor housing, in particular comprises at least in some areas the fluid intake port, at least one first connecting element for connecting at least one second fluid guide element, such as a fluid hose and/or air hose, to the fluid intake port, at least in some areas the fluid outlet port, at least one second connecting element for connecting at least one third fluid guide element, such as a fluid hose and/or air hose to the fluid outlet port, at least one connecting line, in particular in fluid connection with the fluid intake port, the compressor channel and/or the fluid outlet port and/or at least one valve device in particular in active connection with the connecting line, and/or comprises at least one control capsule, preferably for controlling a pressure within the compressor.

The aforementioned embodiment can also be characterized in that an at least indirect fluid connection between the fluid intake port and the fluid outlet port, the compressor channel and the fluid intake port, the compressor channel and the fluid outlet port and/or an ambient atmosphere on the one hand and the fluid intake port, the compressor channel and/or the fluid outlet port on the other hand can be produced by means of the connecting line, wherein preferably the connection is controllable and/or can be regulated by means of the valve device, in particular the valve device is embodied in the form of an ambient-air pulsed valve.

Furthermore, for the three aforementioned alternative embodiments, the third housing part may comprise at least in some areas a thermoplastic material and or thermoset material, in particular glass fiber reinforced, preferably essentially completely made of a thermoplastic material and/or thermoset material, in particular glass fiber reinforced.

It can also be provided thereby that the third housing part is connectable to the first housing part, the second housing part, at least one individual element, in particular the first individual element, the second individual element, the third individual element and/or the fourth individual element, the thermoset body, the thermoplastic body and/or the thermoplastic by means of at least one third connecting element.

Alternative embodiments of the plastic compressor housing can further provide that the third connecting element comprises at least one second recess embodied in the first housing part, the second housing part, at least one individual element, in particular the first individual element, the second individual element, the third individual element and/or the fourth individual element, the thermoset body, the thermoplastic body and/or the thermoplastic, and at least one area of the third housing part can be accommodated in the second recess, whereby preferably the second recess corresponds to the first recess.

It is also proposed thereby that the third connecting element comprises at least one first fastening means embodied in the first housing part, the second housing part, at least one individual element, in particular the first individual element, the second individual element, the third individual element and/or the fourth individual element, the thermoset body, the thermoplastic body and/or the thermoplastic, wherein at least one fastening element can be brought into interaction with the first fastening means, in particular can be connected to the first fastening means, and the third housing part comprises a second fastening means that can be brought into interaction with the fastening element, in particular can be connected to the fastening element.

Furthermore, the first attachment means may comprise at least one first opening and/or a first holder in the first housing part, the second housing part, at least one individual element, in particular the first individual element, the second individual element, the third individual element and/or the fourth individual element, the thermoset body, the thermoplastic body and/or thermoplastic, and the second fastening means may comprise a second opening, in particular aligned with the first opening, and/or second holder in the third housing part, in particular the fastening element can be inserted at least in some areas into the first opening and the second opening, wherein in particular the first and/or the second opening and/or the first and/or the second holder comprises or comprise at least one bore, at least one hole, at least one blind hole and/or at least one thread, and/or the fastening element comprises at least one rivet joint, threaded connection, latch connection, slip joint, adhesive connection and/or clip connection, wherein preferably the thread can be embodied by connecting the fastening element, in particular in the form of a thread-cutting screw.

It is particularly preferred thereby that the third housing part in the area of the third connecting element, in particular in the area of the first fastening means and/or the second fastening means, is in direct contact with the first housing part, the second housing part, the first individual element, the second individual element, the third individual element, the fourth individual element and/or the thermoset body.

Furthermore, it can be provided that the first housing part is connectable to the second housing part, in particular at least one individual element of the first housing part, preferably the first individual element and/or the second individual element, to at least one individual element of the second housing part, preferably the third individual element and/or the fourth individual element, by means of at least one fourth connecting element.

In particular, it is also proposed that at least two individual elements of the first housing part, in particular the first individual element and the second individual element, are connectable to one another by means of at least one fifth connecting element and/or at least two individual elements of the second housing part, in particular the third individual element and the fourth individual element, are connectable to one another by means of at least one sixth connecting element.

With the two aforementioned alternatives it is furthermore advantageous if the fourth connecting element, the fifth connecting element and/or the sixth connecting element comprises at least one rivet joint, at least one threaded connection, at least one clip connection, at least one latch connection, at least one tongue and groove connection, at least one slip joint and/or at least one adhesive connection.

It is also proposed that the first anchoring element, the second anchoring element and/or the third anchoring element comprises at least one recess, such as at least one undercut and/or at least one groove, at least one raised area, such as at least one web, at least one surface area with an increased surface roughness compared to the essentially remaining first, second, third and/or fourth surface, and/or at least one perforation of the first, second, third and/or fourth surface, wherein preferably the recess and/or the perforation is filled essentially completely with the thermoset body, the thermoplastic body and/or the thermoplastic, the web is covered essentially on all sides by the thermoset body, the thermoplastic and/or the thermoplastic, and/or the surface area is covered essentially completely by the thermoset body, the thermoplastic body and/or the thermoplastic.

Furthermore, a plastic compressor housing can be characterized in that at least one first sealing element comprised by the first housing part, at least one second sealing element comprised by the second housing part, at least one third sealing element comprised by the third housing part, at least one fourth sealing element comprised by the first individual element, at least one fifth sealing element comprised by the second individual element, at least one sixth sealing element comprised by the third individual element and/or at least one seventh sealing element comprised by the fourth individual element, wherein preferably the first sealing element, the second sealing element, the third sealing element, the fourth sealing element, the fifth sealing element, the sixth sealing element and/or the seventh sealing element is or are arranged at least in part in the area of at least one contact area of the first housing part, of the second housing part, of the third housing part, of the first individual element, of the second individual element, of the third individual element and/or of the fourth individual element with the first housing part, the second housing part, the third housing part, the first individual element, the second individual element, the third individual element, the fourth individual element, the thermoset body, the thermoplastic body and/or the thermoplastic.

Finally, with this embodiment it is proposed that first sealing element, the second sealing element, the third sealing element, the fourth sealing element, the fifth sealing element, the sixth sealing element and/or the seventh sealing element comprises or comprise at least one recess, in particular to accommodate at least one sealing element, such as an O-ring, and/or at least one sealing compound, preferably comprising silicone at least in some areas.

Further described herein is a method for producing a plastic compressor housing in which a first housing part comprising thermoset at least in some areas and a second housing part comprising thermoset in at least some areas are provided, wherein the first housing part and/or the second housing part comprises or comprise at least two individual elements, wherein the individual elements of the first housing part are arranged relative to one another to form the first housing part, and/or the individual elements of the second housing part are arranged relative to one another to form the second housing part, the first housing part and the second housing part are arranged relative to one another and the first and second housing part and the individual elements are connected to one another by coating the first housing part and the second housing part with at least one thermoset body or at least one thermoplastic body.

It is preferred thereby that the first housing part, the second housing part, at least one individual element, the thermoplastic body and/or the thermoset body, in particular with the connection of the first housing part and the second housing part and the individual elements, is or are covered at least in part with at least one thermoplastic in a hood-like manner by coating with the thermoset body, wherein preferably at least one wall of at least one recess embodied in the first housing part, the second housing part and/or at least one individual element is covered at least in some areas with the thermoplastic.

With the two aforementioned embodiments it is proposed that at least one first anchoring element is embodied on at least one first surface and/or in the area of at least one end edge of the first housing part, the second housing part and/or at least one individual element, in particular during the production of the first housing part, the second housing part and/or the individual element, wherein preferably at least one second surface of the first anchoring element is covered at least in some areas, in particular completely, by the thermoset body or the thermoplastic body.

It is also preferred that at least one second anchoring element is embodied on at least one third surface of the first housing part, the second housing part, at least one individual element and/or the thermoset body, wherein preferably at least one fourth surface of the second anchoring element is covered at least in some areas, in particular completely, by the thermoplastic body or the thermoplastic.

Furthermore, the method can be characterized in that at least one first fluid guide element is connected to at least one fluid intake port, at least one compressor channel and/or at least one fluid outlet port of the plastic compressor housing, wherein the first fluid guide element is covered at least in some areas by the thermoplastic body or the thermoplastic.

It is particularly preferred that at least one third housing part is connected, in particular by means of at least one fastening element, to the first housing part, the second housing part, at least one individual element, the thermoplastic body and/or the thermoset body, wherein the third housing part is preferably accommodated at least in some areas in at least one second recess, in particular the first recess.

It is also proposed for the method that at least one first sealing element is embodied in the first housing part, at least one second sealing element is embodied in the second housing part, at least one third sealing element is embodied in the third housing part and/or at least one fourth sealing element is embodied in at least one individual element.

Finally, in accordance with a method embodiment, the first housing part and the second housing part are connected to one another by means of at least one fourth connecting element, at least two individual elements of the first housing part are connected to one another by at least one fifth connecting element, at least two individual elements of the second housing part and/or at least one individual element of the first housing part and at least one individual element of the second housing part are connected to one another, in particular before a coating with the thermoset body, the thermoplastic body and/or the thermoplastic.

Further disclosed herein is a turbocharger comprising a plastic compressor housing as described.

The present disclosure is based on the surprising realization that compressor housings with a high component complexity, in which in particular multiple undercuts can be provided, can be produced because the plastic compressor housing comprises at least two housing parts, wherein at least one of these housing parts is embodied in at least two parts, wherein a closed integral body can be formed through the embodiment of the housing parts or the individual elements of the first and second housing part of a thermoset, which closed integral body can be converted into a fixed component geometry in an injection mold by coating with the thermoset body, so that the compressor housing meets the highest stability requirements. The coating with the thermoset thus leads to the formation of a housing in which the individual element are connected to one another mechanically through non-positive closure and/or positive closure, wherein through the use of the same materials for the individual components as well as the coating depending on the method parameters of the coating a chemical connection can also occur between the individual components. The integral thermoset body formed in this manner can preferably be surrounded in a hood-like manner by a thermoplastic in a further step in order to achieve a further increase in the component stability, in particular under extreme conditions. This combination of a high component complexity with extremely high stability properties can alternatively also be achieved in that the first and the second housing part, which are composed of a thermoset, are connected to one another in a manner safe from coming loose, for example, via a threaded connection or a clip connection, and the first and second housing part are subsequently directly coated with a thermoplastic body at least in some areas. Due to the fact that an additional coating of the thermoset individual components with a thermoset body can be omitted, the production process of the plastic compressor housing is further simplified.

Usually, for economic reasons compressor housings with such a high component complexity are provided through metallic compressor housings, which are usually produced in the aluminum sand-casting method. The plastic compressor housing or the method disclosed herein makes it possible to provide an embodiment equivalent to these metallic compressor housings in the form of a plastic compressor housing. An integral component of several structurally simple individual parts, which per se in each case can be easily demolded and can be produced with conventional injection method and thus in a cost-effective manner, is thus provided, wherein by uniting the individual components according to a predetermined principle with predefined interfaces an integral body is provided, which can be converted in an injection mold by coating with a thermoset body or a thermoplastic body into a stable component, i.e., having a high stability. A plastic compressor housing as well as a method for producing a plastic compressor housing are thus achieved, which renders possible the production of components with a high level of integration and low production costs that cannot usually be produced in plastic due to uneconomic production technologies. Furthermore, the multiple-part structure of the plastic compressor housing makes it possible for separate individual parts to be combined with one another as desired in a modular manner on the building-block principle, in order to be able to adapt the plastic compressor housing to the respective requirements without any fear of strength disadvantages. Further reductions in costs also result from this, since only different individual components and not complete plastic compressor housings have to be provided for different requirement profiles.

DESCRIPTION OF THE DRAWINGS

Further features and advantages of the invention result from the following specification, in which exemplary embodiments of the invention are explained by way of example based on diagrammatic drawings.

FIG. 7 is a detailed view of section B of FIG. 6;

FIG. 8 is a detailed view of section C of FIG. 6;

FIG. 9 is a cross-sectional view along the section line D-D of FIG. 5;

FIG. 23 is a view of the top of the plastic compressor housing of FIG. 19;

FIG. 24 is a cross-sectional view of the plastic compressor housing of FIG. 19 along the section line G-G of FIG. 23;

FIG. 25 is a detailed view of section H of FIG. 24;

FIG. 26 is a detailed view of section I of FIG. 24;

FIG. 27 is a cross-sectional view of the plastic compressor housing of FIG. 19 along the section line J-J of FIG. 23;

DETAILED DESCRIPTION

Figure 1:
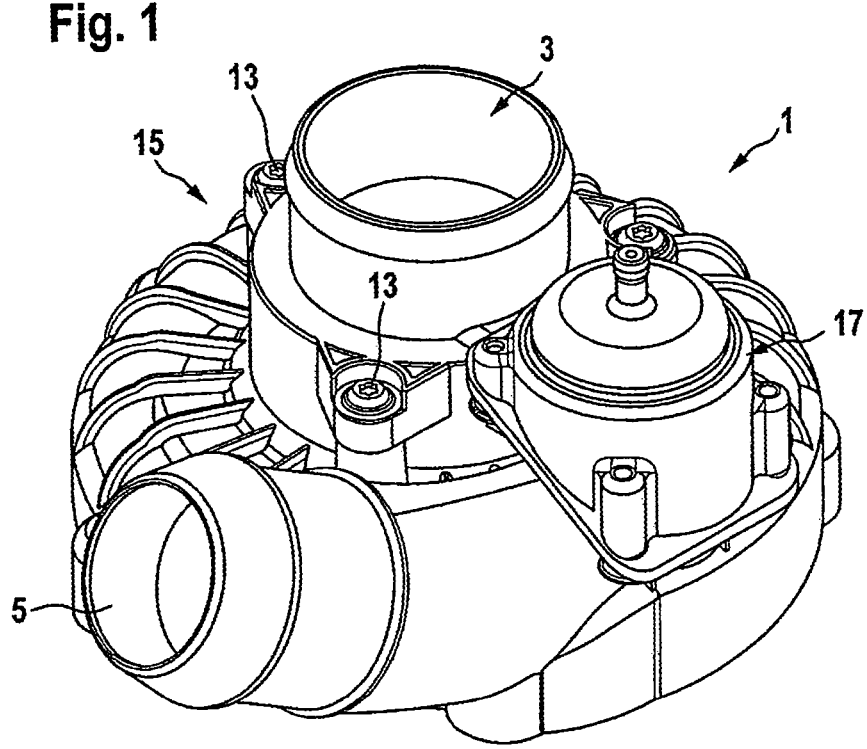
FIG. 1 is a perspective view of a plastic compressor housing according to a first embodiment.

FIG. 1 shows a perspective view of a plastic compressor housing 1. The plastic compressor housing 1 has a fluid intake port in the form of an air intake port 3. The air suctioned via the air intake port 3 can be compressed via a radial compressor wheel (not shown) and is discharged from the plastic compressor housing 1 via a fluid outlet port in the form of an air outlet port 5. As can be seen in particular from FIG. 2, which represents a view of the underside of the plastic compressor housing 1, the plastic compressor housing 1 comprises a first housing part 7, which is formed by a first individual element in the form of an interior part 7a and a second individual element in the form of an upper shell 7b, and a second housing part, which is embodied in one part in the form of a lower shell 9. As will be explained later, through coating with a thermoset body 11 these housing parts 7, 7a, 7b, 9, form an integral component with high structural strength.

By means of fastening elements in the form of screws 13, which can be embodied in particular as thread-cutting screws and which engage in the first fastening means in the form of blind holes embodied in the thermoset body 11, a third housing part 15, which is also referred to as an attachment, is fastened on the component formed by the housing part 7, the lower shell 9 and the thermoset body 11. As can be seen from FIG. 1, through the third housing part 15 a first connecting element is provided to connect the air intake port 3 to an air intake hose, not shown. Furthermore, through the third housing part 15 a valve arrangement in the form of an ambient-air pulsed valve 17, the function of which will be explained in detail later, is provided in the plastic compressor housing 1.

Figure 3:
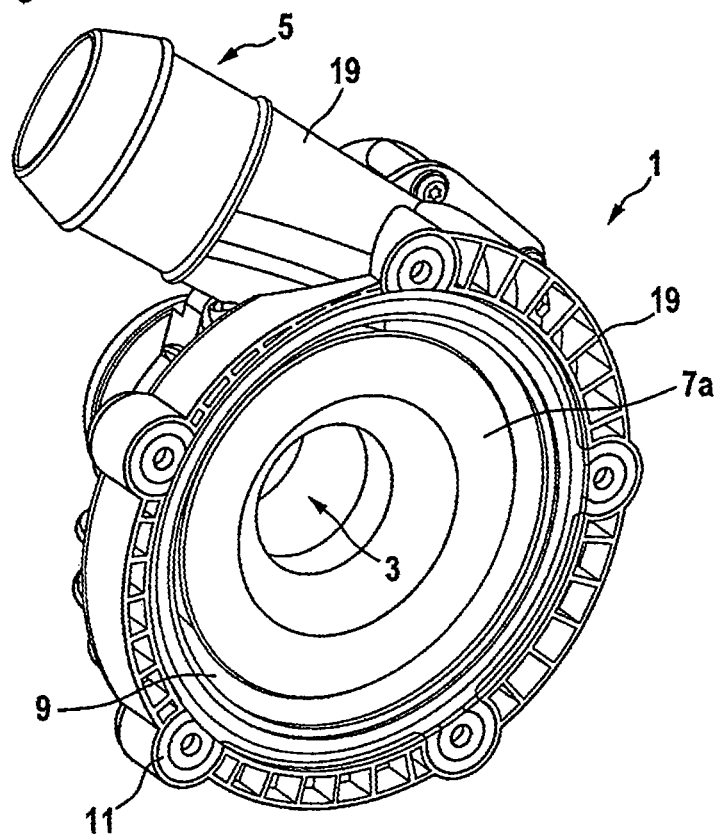
FIG. 3 is a perspective view of the underside of the plastic compressor housing of FIG. 1.

FIG. 3 shows a perspective view of the underside of the plastic compressor housing 1. As can be seen in particular from FIG. 3, the thermoset body 11 and thus also the first housing part 7 and the second housing part 9 of the plastic compressor housing 1 is covered in a hood-like manner by a thermoplastic 19. This thermoplastic 19 is produced in particular by coating. It is ensured through the thermoplastic 19 that with extreme loads, such as can occur in particular with a containment test, a greatest possible safety of the plastic compressor housing 1 is secured. Thus, with extreme loads, a destruction can occur of the integrity of the housing part 7 composed of thermoset, the lower shell 9 and the thermoset body 11, for example when a radial compressor wheel rotating in the plastic compressor housing 1 comes into contact with the first housing part 7 or the lower shell 9. It is ensured through the thermoplastic 19 in such a case that no fragments of the housing part 7, of the interior part 7a, of the upper shell 7b, of the lower shell 9 or of the thermoset body 11 can exit the plastic compressor housing 1.

Figure 2:
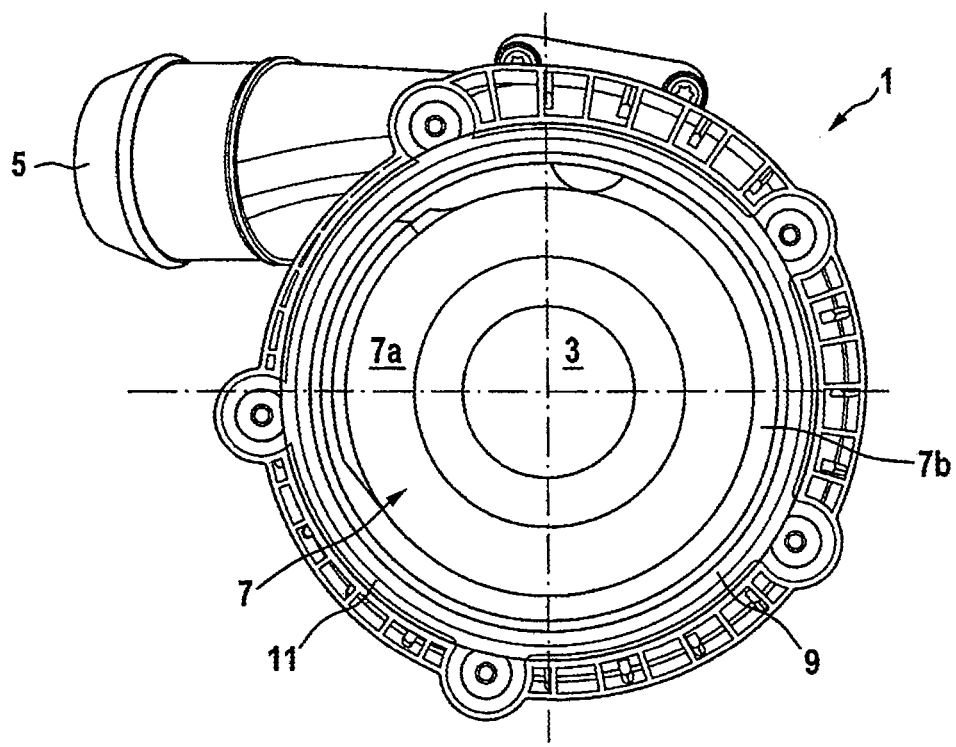
FIG. 2 is a view of the underside of the plastic compressor housing of FIG. 1.
Figure 4:
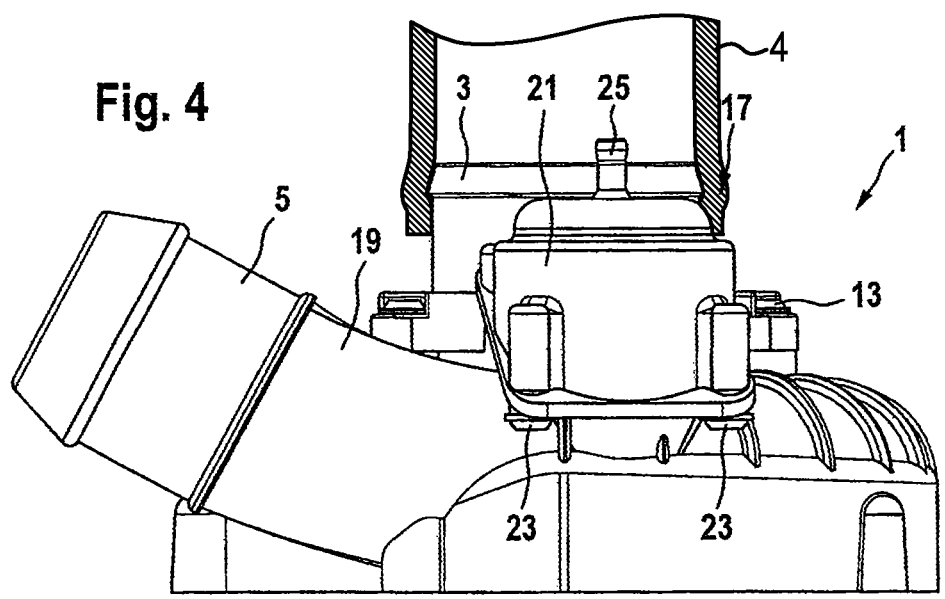
FIG. 4 is a side view of the plastic compressor housing of FIG. 1.

FIG. 4 shows a side view of the plastic compressor housing 1 of FIGS. 1 through 3. As can be seen from FIG. 4, the ambient-air pulsed valve 17 has a cover 21 that is attached by screws 23 to the third housing part 15. The cover 21 and/or the third housing part 15 comprises or comprise preferably a glass fiber reinforced thermoplastic material. Furthermore, a connection port 25 is arranged on the cover 21 for connection to a vacuum supply (not shown).

Figure 5:
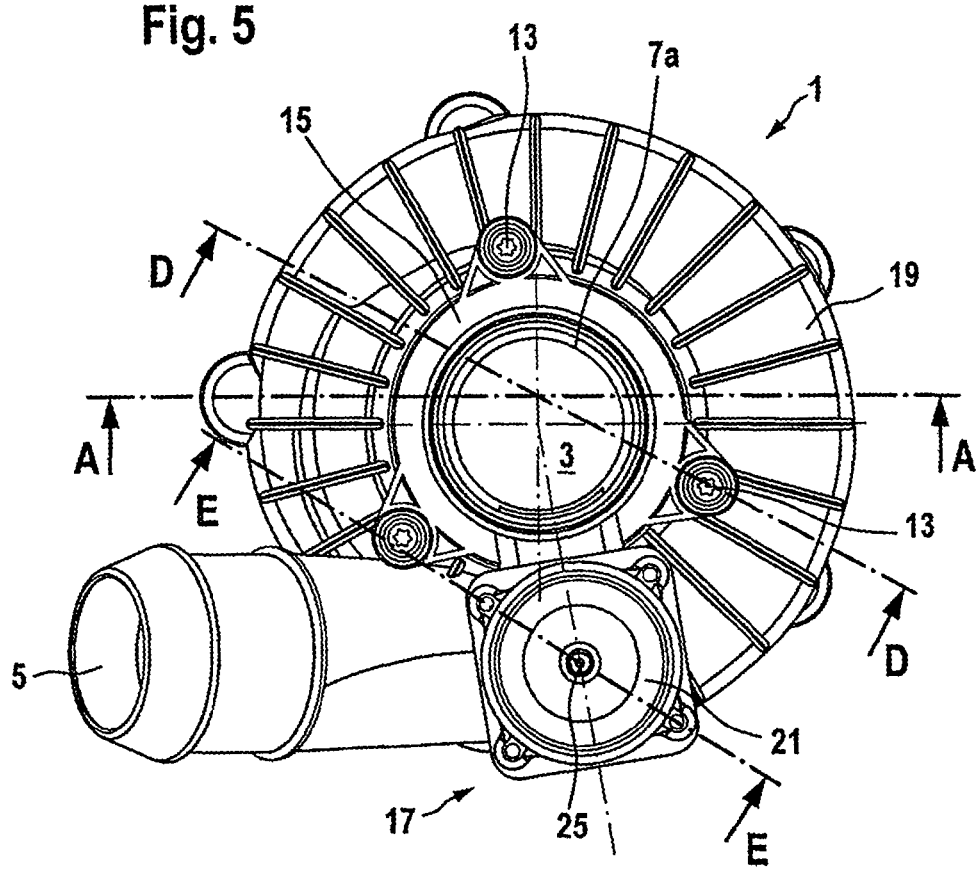
FIG. 5 is a view of the top of the plastic compressor housing of FIG. 1.

FIG. 5 shows a view of the top of the plastic compressor housing 1 of FIGS. 1 through 4. The reference numbers correspond to those of FIGS. 1 through 4.

Figure 6:
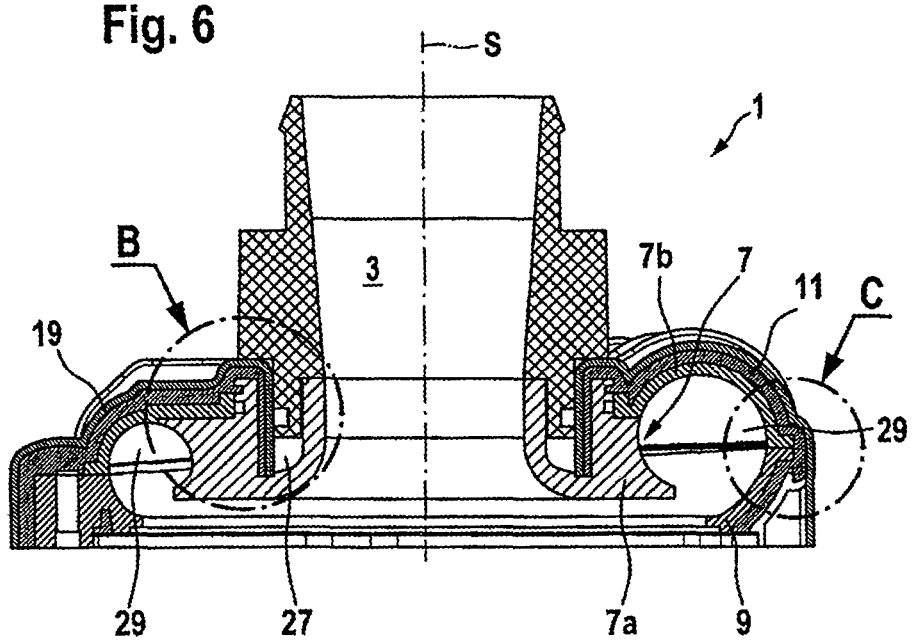
FIG. 6 is a cross-sectional view of the plastic compressor housing along the section line A-A of FIG. 5.

FIG. 6 shows a cross-sectional view of the plastic compressor housing 1 along the section line A-A of FIG. 5. FIG. 6 shows in particular the relative positions of the first housing part 7, which is formed by an interior part 7a and an upper shell 7b, and of the second housing part, which is formed by the lower shell 9. Furthermore, it can be seen from FIG. 6 that the housing part 7 and the lower shell 9, each of which is composed of a thermoset material, are coated with the thermoset body 11. The thermoset body 11 is surrounded by the thermoplastic 19 in a hood-like manner.

As can be seen further from FIG. 6, from its contour the interior part 7a is embodied such that a first recess 27 is embodied in the interior part 7a. As can be seen in particular from FIG. 7, which represents a detailed view of section B from FIG. 6, the coating of the housing part 7 in the form of the thermoset body 11, extends into the recess 27. Furthermore, the thermoplastic 19 also extends into the recess 27. As shown in particular in FIG. 6, this extension of the thermoplastic 19 leads to the formation of a so-called double barrier. This means that a penetration by fragments of a radial compressor wheel (not shown) from a compressor channel through the thermoset material in the form of the interior part 7a, the upper shell 7b, the lower shell 9 or the thermoset body 11 is stopped at the thermoplastic 19 in the direction of an axis of symmetry S of the plastic compressor housing 1 as well as in a direction from the axis of symmetry S radially outwards. In the same way thermoset fragments are prevented from penetrating the interior part 7a into the air inlet port 3 from the direction of the compressor channel 29. The safety of the plastic compressor housing 1 is thus also increased in the event that the structural integrity of one of the thermoset elements of the plastic compressor housing 1 is destroyed. Furthermore, this double barrier leads to the formation of an improved fluid-tightness so that liquids, such as oil, entrained in a gas are effectively prevented from leaking out of the plastic compressor housing 1.

Furthermore, the recess 27 acts as a second recess, since the third housing part 15 is accommodated at least in part in the recess 27. As can be further seen from FIG. 7, the interior part 7a has a sealing element 31. The sealing element 31 is embodied in the form of an O-ring arranged in a groove. Although a secure connection of the individual elements of the housing part 7, i.e., of the interior part 7a and of the upper shell 7b, is ensured under normal conditions through the thermoset body 11, it is ensured through the sealing element 31 that even with extreme loads at which a relative movement between the interior part 7a and the upper shell 7b can occur, a sealing of the compressor channel 29 is ensured. Analogously the third housing part 15 has a sealing element 33 in the form of an O-ring arranged in a groove. Through this in particular a sealing of the air intake port 3 is achieved, even if relative movements occur of the components composed of different materials of the plastic compressor housing in the form of the third housing part 15 and the housing parts 7, 9 or of the thermoset body 11.

Furthermore, FIG. 7 shows that the interior part 7a has a first anchoring element in the form of an undercut 35. The undercut 35 ensures that the interior part 7a is anchored in the thermoset body 11 during a coating of the first housing part 7 with the thermoset body 11.

As represented in particular by FIG. 8, which shows a detailed view of section C of FIG. 6, furthermore the upper shell 7b and the lower shell 9 also have anchoring elements. For example, a raised area 37 is embodied on the end edge of the upper shell 7b, while the lower shell 9 has a raised area 39 on an end edge. Through the raised area 37 and 39 an anchoring of the upper shell 7b and the lower shell 9 in the thermoset body 11 during coating with the thermoset material is achieved by means of a positive closure and a non-positive closure.

The thermoset body 11 also has a second anchoring element in the form of an undercut 41. Through this anchoring element a secure non-positive hold or positive hold of the thermoplastic 19 on the thermoset body 11 is achieved. The anchoring elements 35, 37, 39 and 41 thus act as anchor points for the interior part 7a, the upper shell 7b and the lower shell 9 as well as the thermoplastic 19 on the thermoset body 11.

FIG. 9 shows a cross-sectional view of the plastic compressor housing 1 along the section line D-D of FIG. 5. As shown in particular by a combination of FIG. 9 with FIG. 10, which shows a cross-sectional view of the plastics compressor housing 1 along the section E-E in FIG. 5, the interior part 7a provides a helical internal contour, which is formed like a snail-shell, for the compressor channel 29.

Figure 11:
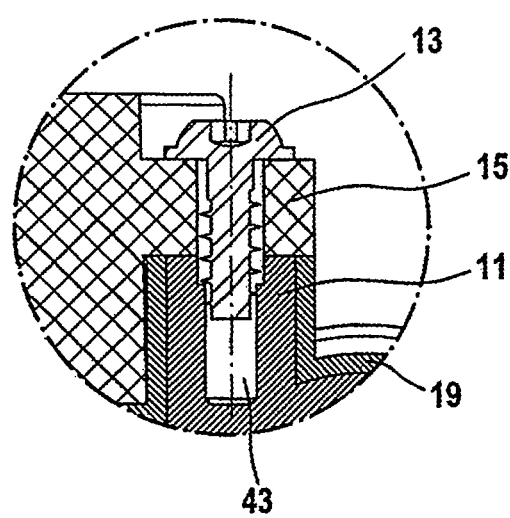
FIG. 11 is a detailed view of section F of FIG. 9.
Figure 12:
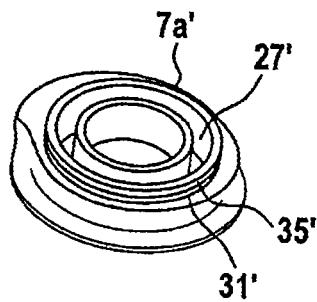
FIG. 12 is a perspective view of an interior part of a second embodiment of a plastic compressor housing.
Figure 13:
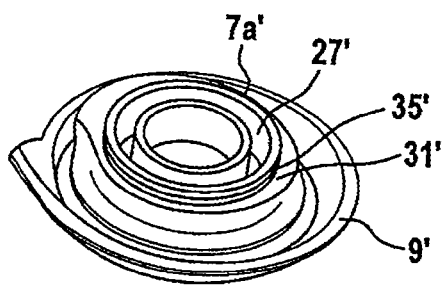
FIG. 13 is a perspective view of the interior part of FIG. 12 in combination with a lower shell.

FIG. 11 shows a detailed view of section F of FIG. 9. As can be seen from FIG. 11, the third housing part 15 is attached to the thermoset body 11 by means of the fastening elements in the form of the screws 13. To this end the thermoset body 11 has a blind hole 43. The blind hole 43 forms a fastening means in which the thread-cutting screw engages. As FIG. 11 in particular shows, a direct contact of the third housing part 15 with the thermoset body 11 is ensured in the area of the first fastening means in the form of the blind hole 43, since in this area the thermoplastic 19 does not cover the thermoset body 11. It is thus ensured that no relative movement occurs between the third housing part 15 and the thermoset body 11.

The mode of operation of the ambient-air pulsed valve 17 will now be explained based on FIG. 10. The ambient-air pulsed valve 17 has a valve chamber 45 that is essentially defined by the third housing part 15. Through an opening 47 in the third housing part 15 as well as in the upper shell 7b, the valve chamber 45 is in fluid contact with the compressor channel 29 in the area of the air outlet port 5. For sealing the valve chamber 45, the upper shell 7b has a sealing element 49 in the form of a recess in which a sealing element (not shown) in the form of an O-ring is arranged. The opening 47 can be closed by means of a diaphragm 51, which can comprise in particular a rubber material. By applying a vacuum via the connection port 25, a vacuum can be produced within a diaphragm chamber 53, through which a movement of the diaphragm 51 occurs, through which the opening 47 is opened.

The diaphragm is thereby moved against the force of a spring element (not shown), which forces the diaphragm 51 in the direction of the opening 47. It can also be provided that an operating element is arranged in a cylinder chamber 55, which operating element is mechanically connected to the diaphragm 51, wherein through a vacuum applied by means of the connection port 25, a movement of the operating element and thus of the diaphragm 51 is triggered to release the opening 47. In particular in the aforementioned embodiments the diaphragm 51 can be actively connected to at least one reinforcing element, such as a supporting pad, in particular comprise this element. The operating element as well as the spring element can act on the reinforcing element.

Figure 10:
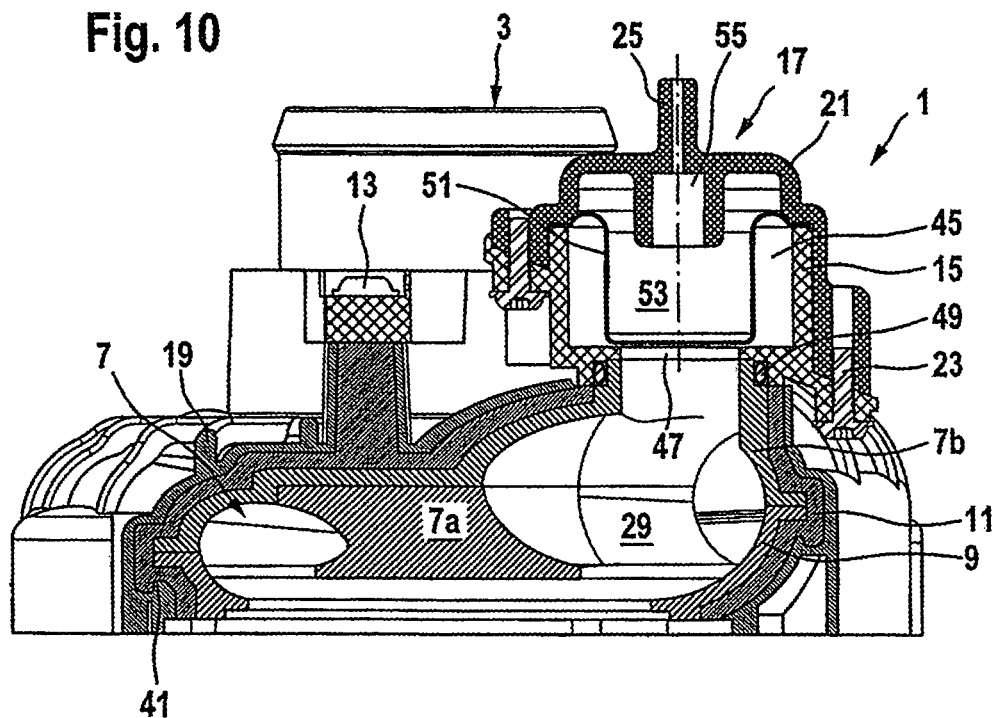
FIG. 10 is a cross-sectional view along the line E-E of FIG. 5.

A connecting line, not shown in FIG. 10, is embodied in the third housing part 15, which connecting line connects the valve chamber 45 to the air intake port 3. An ambient-air pulsed valve of this type is used in particular in turbochargers for spark ignition engines, in order to prevent an excessively high charge air pressure being generated by the turbocharger with a closed throttle valve.

Although an ambient-air pulsed valve 17 that is embodied as a vacuum valve has been described, an ambient-air pulsed valve 17 designed as a relief valve can be used.

Based on FIGS. 12 through 18, a method for producing a plastic compressor housing 1' will now be explained. Those elements of the plastic compressor housing 1' that functionally correspond to those of the plastic compressor housing 1 bear the same reference numbers albeit with single prime sign.

Figure 14:
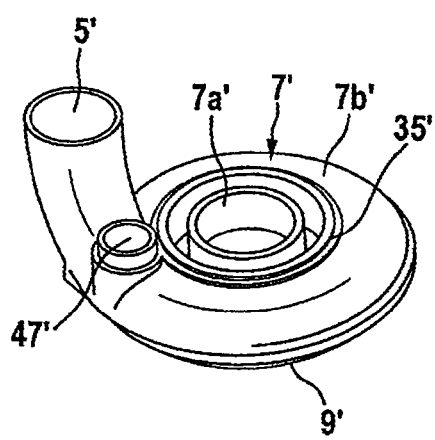
FIG. 14 is a perspective view of the interior part and the lower shell of FIG. 13 after connection to an upper shell.
Figure 15:
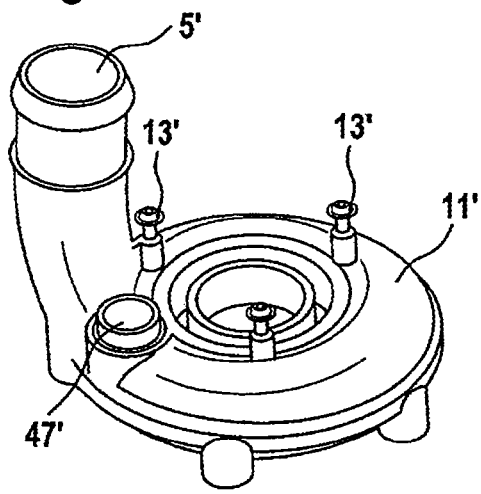
FIG. 15 is a perspective view of the elements of FIG. 14 after coating with a thermoset body.
Figure 16:
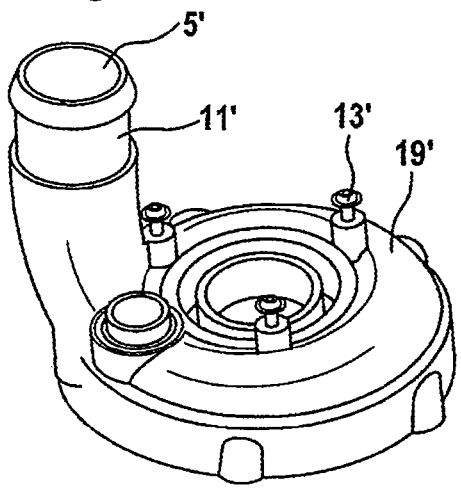
FIG. 16 is a perspective view of the elements shown in FIG. 15 after being covered in a hood-like manner with a thermoplastic.
Figure 17:
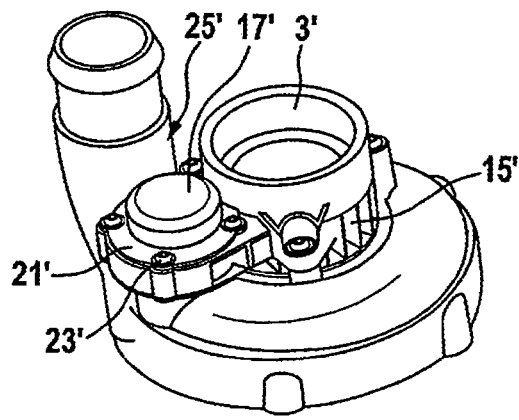
FIG. 17 is a view of the plastic compressor housing of FIG. 16 after a third housing part has been attached.

In a first step, firstly a screw or an interior part 7a' is provided, which can be embodied from a thermoset body by injection molding. As can be seen from FIG. 13, a lower shell 9' is arranged around the interior part 7a'. The lower shell 9' is also formed from a thermoset material and can be produced in a injection-molding process due to its comparatively simple cross-sectional shape. Subsequently, in a next step, which is shown in FIG. 14, a first housing part 7' is finished by assembling the interior part 7a' with an upper shell 7b'. As can be seen in particular from FIG. 14, the air outlet port 5' is provided at least in part by the upper shell 7b', and in FIG. 14 the arrangement of the opening 47' to provide a fluid connection to a compressor channel is shown. Furthermore, it can be seen from FIG. 14 that those parts of the interior part 7a' that comprise the undercut 35', are arranged such that they project out of the upper shell 7b'. With a subsequent coating of the first housing part 7' and of the second housing part in the form of the lower shell 9' with a thermoset body 11', as shown in FIG. 15, it is achieved that not only the upper shell 7b' and the lower shell 9' but also the interior part 7a' are anchored to the thermoset body 11' in that all housing parts or individual elements are in contact with the thermoset body 11'. In a subsequent step the thermoset body 11' is covered by a hood-like coating of the thermoplastic 19'. In the variant shown in FIG. 16, the end of the air outlet port 5' formed by the thermoset body 11' is not covered by the thermoplastic body 19'. In an alternative embodiment this area of the thermoset body 11' can also be covered with thermoplastic or also another fluid guide element, such as a filter element, can be connected to the air outlet port 5' and covered at least in part by the thermoplastic 19'. A secure connection of the plastic compressor housing 1' to the fluid guide element can be achieved through this in a simple manner. As can be further seen from FIG. 16, however, the thermoplastic 19' does not cover the thermoset body 11' in the area of the screws 13'. It is thus ensured that a secure fastening of the third housing part 15' on the thermoset body 11' is achieved.

Figure 18:
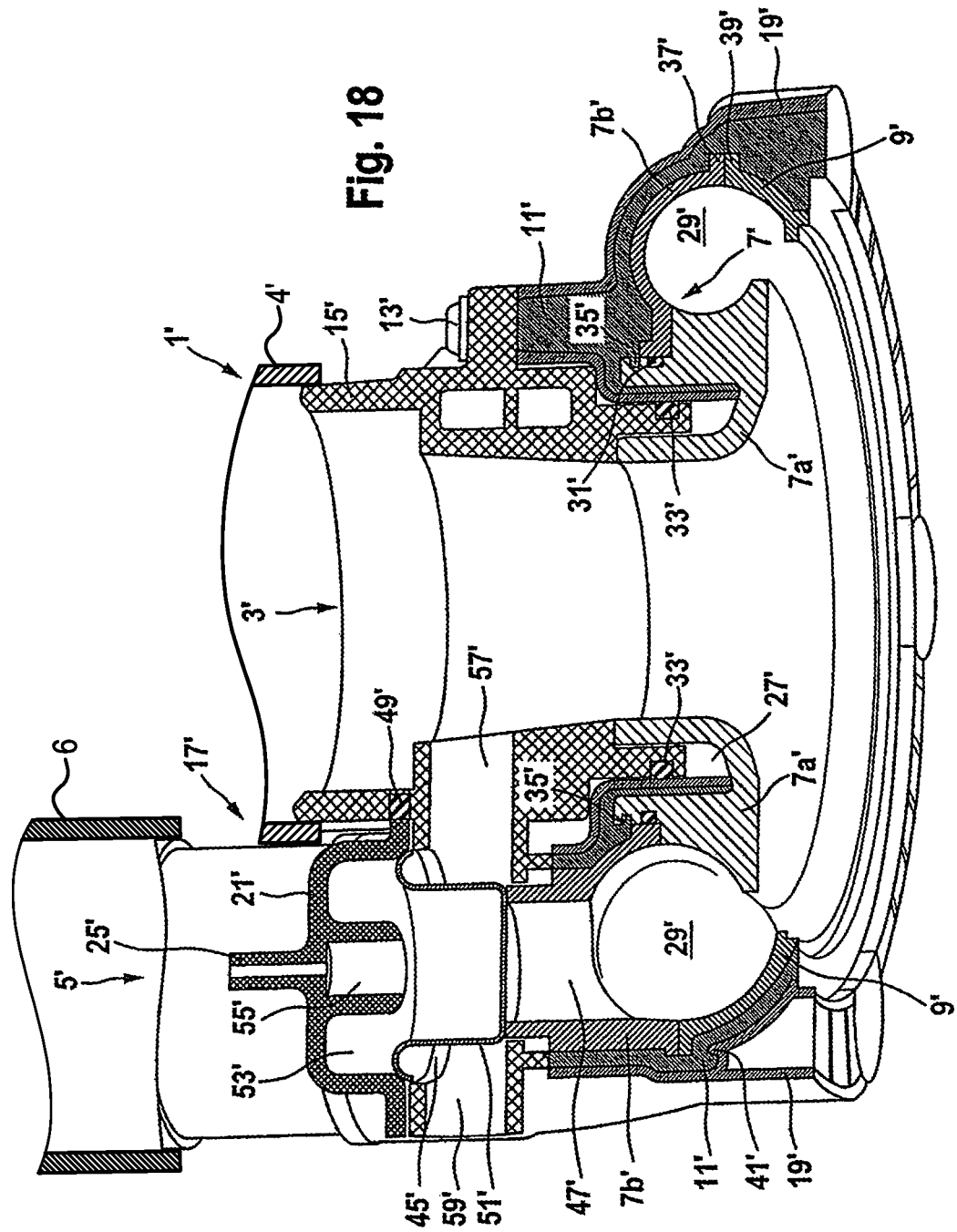
FIG. 18 is a cross-sectional view of the plastic compressor housing of FIG. 17.

FIG. 18 shows a cross-sectional view of the plastic compressor housing 1'. Further details of the third housing part 15' of the plastic compressor housing 1' can be seen from FIG. 18. For example, the third housing part 15' has a connecting line 57'. This connecting line 57' is in fluid connection on the one hand with the valve chamber 45' and on the other hand with the air intake port 3'. In the event that the diaphragm 51' releases the opening 47', in this manner a secondary circuit is opened between the air outlet port 5' and the air intake port 3'. The reason for this is that the opening 47' in the area of the air outlet port 5' opens into the compressor channel 29'. When the plastic compressor housing 1 is used for a turbocharger of a spark-ignition engine, it is thereby achieved that with a closed throttle valve a generation of an excessively high charging pressure by the turbocharger is avoided, since the air from the compressor channel 29' expands through the opening 47' and the connecting line 57' in the air intake port 3' again or the major part of the compressor channel 29' is avoided via a bypass. The third housing part 15' furthermore has a connecting line 59' that connects the valve chamber 45' to the environment of the plastic compressor housing 1'. Through a suitable closure of one of the connecting lines 57' or 59' via a closure element (not shown), an expansion of the compressed charge air can optionally be achieved via the ambient-air pulsed valve 17' into the ambient atmosphere or the air intake port 3'. The outlet of the connecting line 59' can also be connected to another component, such as another fluid line or a filter or damper.

Figure 19:
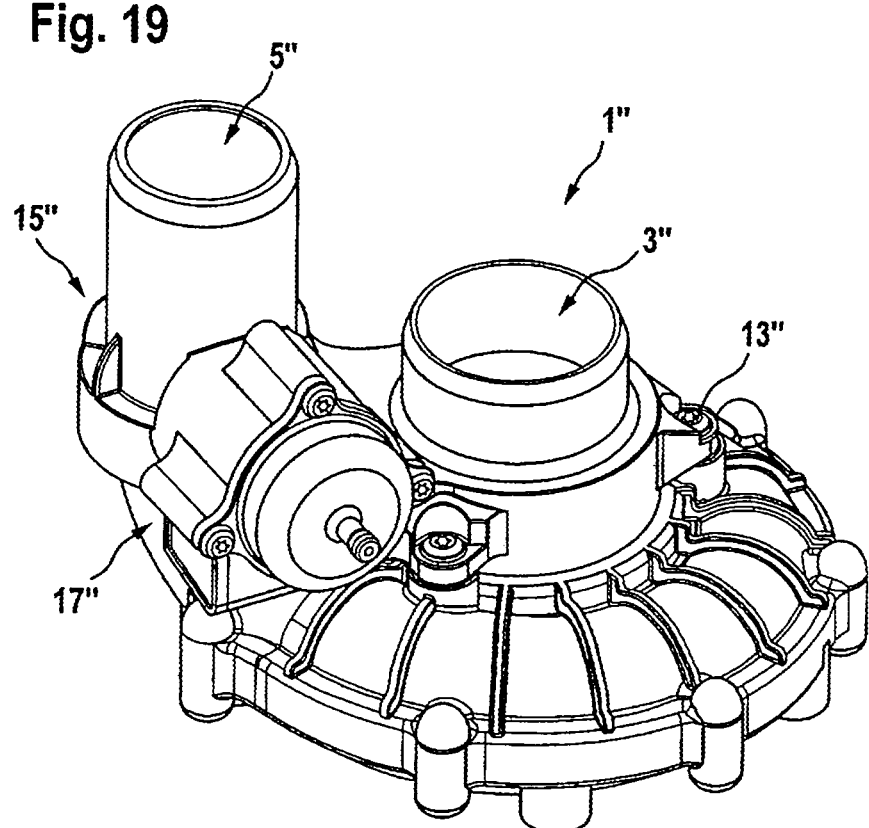
FIG. 19 is a perspective view of a plastic compressor housing according to a third embodiment.

FIG. 19 shows a third embodiment of a plastic compressor housing 1". Those elements of the plastic compressor housing 1" that functionally correspond to those of the plastic compressor housing 1 or the plastic compressor housing 1' bear the same reference numbers, but with double prime sign.

Compared to the plastic compressor housings 1, 1', the plastic compressor housing 1" has a changed arrangement of the air outlet port 5", which results from a geometrically changed form of the first housing part 7" and of the second housing part 9". The air outlet port 5" is furthermore in part embodied by the third housing part 15" and has an axis of symmetry that runs essentially parallel to the axis of symmetry of the air intake port 3".

Figure 20:
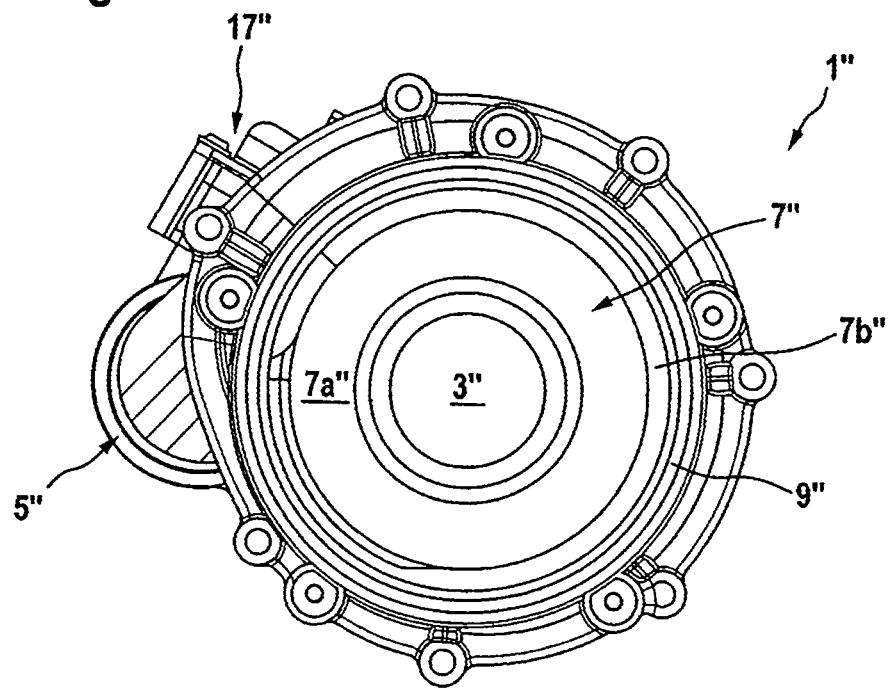
FIG. 20 is a view of the underside of the plastic compressor housing of FIG. 19.

Similar to the plastic compressor housings 1, 1', the plastic compressor housing 1" according to FIGS. 19 and 20 has a first housing part 7", which is embodied by individual elements in the form of an interior part 7a" and an upper shell 7b". Furthermore, the plastic compressor housing 1" comprises a second housing part, which is embodied essentially in one part in the form of a lower shell 9". The first housing part as well as the second housing part of the plastic compressor housing 1" are formed by a thermoset material and/or comprise a thermoset material.

Figure 21:
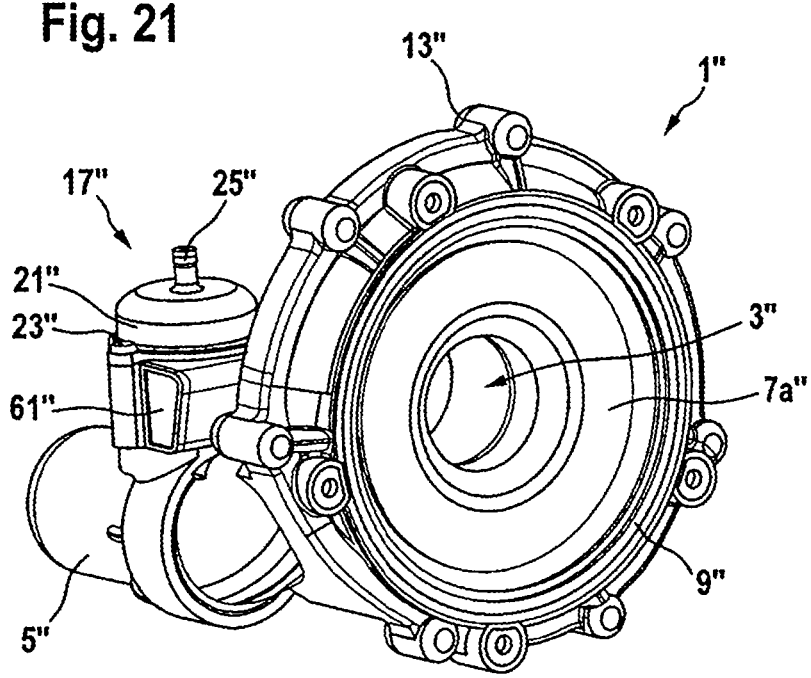
FIG. 21 is a perspective view of the underside of the plastic compressor housing of FIG. 19.
Figure 22:
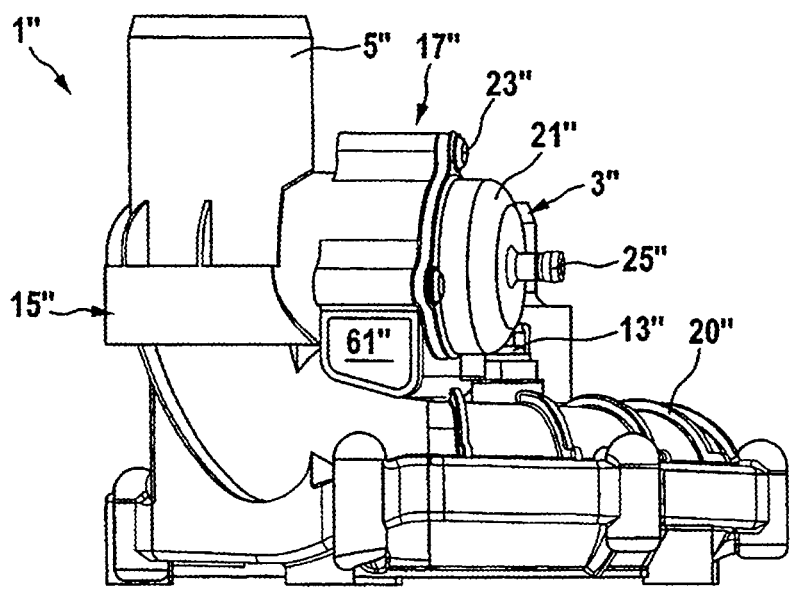
FIG. 22 is a side view of the plastic compressor housing of FIG. 19.

As can be seen from FIGS. 21 and 22, which show perspective views of the plastic compressor housing 1", the first housing part 7" as well as the second housing part in the form of the lower shell 9" are coated with a thermoplastic body 20". The third housing part 15" is fastened to the thermoplastic body 20" by means of a third connecting element in the form of screws 13". Furthermore it is shown in FIG. 22 that the air outlet port 5" essentially is formed by the third housing part 15". A part of the ambient-air pulsed valve 17" is embodied on the third housing part 15". The ambient-air pulsed valve 17" is completed through a cover 21" attached to the third housing part 15" via screws 23". A connection port 25" for a pressure control is embodied in the cover 21".

FIG. 23 shows a perspective view of the plastic compressor housing 1". Based on FIGS. 24 through 29, which show sectional views along the sections G-G, J-J and L-L and respective detailed views along sections H, I, K of the sectional views, the production and the structure of the plastic compressor housing 1" is explained in more detail below.

FIG. 24 shows a cross-sectional view of the plastic compressor housing 1" along the section G-G of FIG. 23. As can be seen from FIG. 24, a first housing part 7" is formed by an interior part 7a" and an upper shell 7b". A second housing part is formed by a lower shell 9". In contrast to the plastic compressor housings 1, 1', however, the first housing part 7" and the second housing part 9" are not coated with a thermoset body. The first and the second housing part are connected to one another in the production of the plastic compressor housing 1" via a fourth connecting element in the form of a threaded connection 22". The individual elements 7b" and 9" thus connected to one another are then placed into a mold, wherein the interior part 7a" is subsequently placed in the upper shell 7b". Due to the threaded connection 22", a relative movement between these two elements during a coating with the thermoplastic body 20" is ruled out. Due to the outer contours or inner contours of the interior part 7a" and the upper shell 7b" adapted to one another, a relative movement between these elements of the first housing part during a coating with the thermoplastic body 20" is ruled out so that in the embodiment shown an additional connecting element between these individual elements can be omitted.

The thermoplastic body 20" covers the anchoring elements embodied in the first and second housing part such that a firm bond between the housing parts is formed. In particular the thermoplastic body 20" encloses raised areas 37", 39" and enters undercuts 41" and recesses 27". The thermoplastic body 20" also encloses undercuts 35". The individual elements 7a", 7b" and 9" are thus connected to one another via the thermoplastic body 20" in a positive and non-positive manner or anchored in the thermoplastic body 20". Since the thermoplastic body 20" furthermore enters a recess 27" or fills it, a double barrier, as previously described, also forms in the plastic compressor housing 1". Although a fragment of an individual element or of a compressor wheel (not shown) entering the interior part 7a" from the compressor channel 29" could lead to a destruction of the interior part 7a", the fragment would be stopped at the thermoplastic barrier embodied in the recess 27a".

Due to the fact that the thermoplastic body 20" enters circulating in a clearance 24" between the interior part 7a" and the upper shell 7b", furthermore a connection by adhesive force of the interior part 7a "and the upper shell 7b" also occurs via the thermoplastic body 20". After a coating has occurred of the first and second housing parts of the plastic compressor housing 1", the third housing part 15", which is embodied in the form of an attachment, can be fastened via screws 13" to the thermoplastic body 20" or the first housing part 7" and the second housing part 9".

FIG. 25 shows a detailed view of the section H of FIG. 24. It can be seen in particular from FIG. 25 how the thermoplastic body 20" engages in the undercuts 35" for anchoring, fills the recess 27" to embody the double barrier and that sealing elements 31" and 33" are arranged between the interior part 7a" and the upper shell 7b" on the one hand or the thermoplastic body 20" and the third housing part 15". The sealing elements 31" and 33" are embodied in the form of O-rings. Furthermore, it is discernible how the outer contour of the interior part 7a" is adapted to the inner contour of the upper shell 7b" in order to avoid a displacement of these elements with respect to one another during a coating of the thermoplastic body 20".

FIG. 26 shows a detailed view of the section I of FIG. 24. It can be clearly seen how the upper shell 7b" and the lower shell 9" are connected to one another in a non-positive manner via the threaded connections 22". It is thereby ensured that the upper shell 7b" cannot move relative to the lower shell 9" when the thermoplastic body 20" is produced by coating. Furthermore, in FIG. 26 a further sealing element 32" is discernible, which ensures a seal between the upper shell 7b" and the lower shell 9", so that in particular fluids cannot leak out of the compressor channel 29" even with extreme loads.

FIG. 27 shows a cross-sectional view of the plastic compressor housing 1" along the section J-J of FIG. 23. As can be seen in particular from FIG. 27, the air intake port 3" is connected to a valve chamber 45" via a connecting line 57". A diaphragm 51" is arranged in the valve chamber 45". The connecting line 57" is closed on one side via a closure element 61" and on the other side opens into the air intake port 3", as shown in particular in FIG. 24. As is explained in particular based on FIG. 29, an ambient-air pulsed valve 17" is opened and closed via the diaphragm 51". Upon opening of the ambient-air pulsed valve 17" by a movement of the diaphragm 51", a connection is produced of the air intake port 3" to the air outlet port 5". This occurs in particular in situations in which a throttle valve of the engine is closed and an excessively high pressure forms in the air outlet port 5". As can be further seen from FIG. 27, the screws 23" are used to attach a cover 21" to the third housing part 15".

Figure 28:
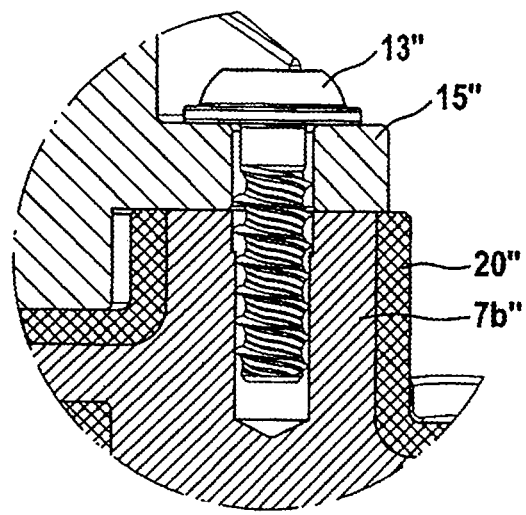
FIG. 28 is a detailed view of section K of FIG. 27.

FIG. 28 shows a detailed view of section K of FIG. 27. As can be seen from FIG. 28, the third housing part 15" is connected via screws 13" to the first or second housing part. However, as can be seen from FIG. 28, the thermoplastic body 20" does not cover the upper shell 7b" completely, so that the third housing part 15" bears directly against the upper shell 7b", which comprises thermoset material. A relative movement of the third housing part 15", preferably comprising a fiber reinforced thermoplastic, relative to the upper shell 7b" is thus avoided.

Figure 29:
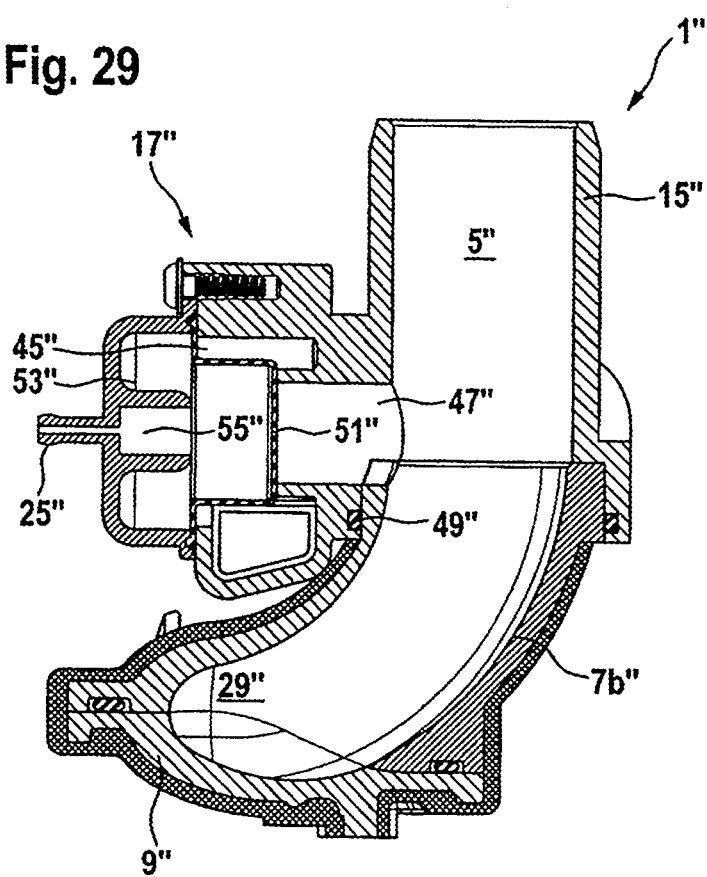
FIG. 29 is a cross-sectional view of the plastic compressor housing of FIG. 19 along the section line L-L of FIG. 23.

Finally, based on FIG. 29, which shows a cross-sectional view of the plastic compressor housing 1" along the section L-L of FIG. 23, the mode of operation of the ambient-air pulsed valve 17" is supplemented. As can be seen from FIG. 29, the valve chamber 45" into which the connecting line 57" to the air intake port 3" opens, is separated by means of the diaphragm 51" from an opening 47", that opens into the air outlet port 5". By applying a corresponding pressure signal to the connection port 25", the diaphragm 51" can be moved against a spring element (not shown) in the direction of the cylinder chamber 55" and thus a connection can be made between the connecting line 57" and the opening 47" and thus a connection can be made between the air intake port 3" and the air outlet port 5". A bypass line is thus formed around the compressor so that the air from the air intake port 3" can enter directly into the air outlet port 5".

As can be further seen from FIG. 29, through the third housing part 15" at least in some areas a functional component of the plastic compressor housing 1" is formed in the form of the air outlet port 5". Furthermore, through the third housing part 15" a further functional component of the compressor formed by the plastic compressor housing 1" is also formed in the form of the ambient-air pulsed valve 17". Further functional components of the compressor can likewise be formed at least in part by the first housing part, the second housing part or the third housing part. Thus in a preferred embodiment of the plastic compressor housing 1" it is provided that a so-called control capsule is embodied at least in part in one of the housing parts. A control capsule is understood to be an element that is used to regulate the pressure on the turbine side of the compressor. However, since very high temperatures can be present on the turbine side, it is preferred that a control capsule of this type is arranged on the compressor side of the compressor and a pressure regulation on the turbine side is achieved via a mechanical element connected to the control capsule. Due to the multiple-part nature of the plastic compressor housing, those functional elements of a compressor leading to a high component complexity can also be integrated at least in part into the plastic compressor housing without the production process becoming complicated or the stability of the plastic compressor housing being impaired thereby.

The features of the invention disclosed in the above specification, in the drawings and in the claims can be used for the realization of the invention in its various embodiments individually as well as in any desired combination.

| List of Reference Numbers | |
|---|---|
| 1, 1', 1" | Plastic compressor housing |
| 3, 3', 3" | Air intake port |
| 5, 5', 5" | Air outlet port |
| 7, 7', 7" | Housing part |
| 7a, 7a', 7a" | Interior part |
| 7b, 7b', 7b" | Upper shell |
| 9, 9', 9" | Lower shell |
| 11, 11' | Thermoset body |
| 13, 13', 13" | Screw |
| 15, 15', 15" | Housing part |
| 17, 17', 17 | Ambient air pulsed valve |
| 19, 19' | Thermoplastic |
| 20" | Thermoplastic body |
| 21, 21', 21" | Cover |
| 22" | Threaded connection |
| 23, 23', 23" | Screw |
| 24" | Clearance |
| 25, 25', 25" | Connection port |
| 27, 27', 27"" | Recess |
| 29, 29', 29" | Compressor channel |
| 31, 31', 31" | Sealing element |
| 32" | Sealing element |
| 33, 33', 33" | Sealing element |
| 35, 35', 35" | Undercut |
| 37, 37', 37" | Raised area |
| 39, 39', 39" | Raised area |
| 41, 41', 41" | Undercut |
| 43 | Blind hole |
| 45, 45', 45" | Valve chamber |
| 47, 47', 47" | Opening |
| 49, 49', 49" | Sealing element |
| 51, 51', 51" | Diaphragm |
| 53, 53', 53" | Diaphragm chamber |
| 55, 55', 55" | Cylinder chamber |
| 57', 57" | Connecting line |
| 59', 59" | Connecting line |
| 61" | Closure element |
| A-A | Section line |
| B | Section |
| C | Section |
| D-D | Section line |
| E-E | Section line |
| F | Section |
| G-G | Section line |
| H | Section |
| I | Section |
| J-J | Section line |
| K | Section |
| L-L | Section line |
| S | Axis of symmetry |

We claim:

1. A plastic compressor housing for a turbocharger, comprising:
   at least one first housing part; and
   at least one second housing part,
   wherein the first housing part and the second housing part respectively comprise, at least in some areas, at least one thermoset material,
   wherein at least one of the first housing part and the second housing part comprises at least two individual elements, and
   wherein the first housing part and the second housing part are coated, at least in some areas, with at least one thermoset body or at least one thermoplastic body such that the first housing part, the second housing part, and the individual elements of the first housing part or the second housing part, respectively, are in contact at least in some areas with the thermoset body or the thermoplastic body.

2. The plastic compressor housing according to claim 1, wherein the first housing part comprises at least one first individual element in the form of at least one first interior part providing or limiting, at least in part, at least one helical internal contour and/or at least one compressor channel, and a second individual element in the form of at least one upper shell.

3. The plastic compressor housing according to claim 2, wherein the second housing part comprises at least one third individual element in the form of at least one second interior part providing or limiting, at least in part, at least one helical internal contour and/or at least one compressor channel, and a fourth individual element in the form of at least one lower shell.

4. The plastic compressor housing according to claim 3, wherein the first housing part, the second housing part, and/or at least one of the first individual element, the second individual element, the third individual element, and the fourth individual element, on at least one first surface and/or in the area of at least one end edge, comprises at least one first anchoring element, wherein at least one second surface of the first anchoring element is covered, at least in some areas, by the thermoset body or the thermoplastic body.

5. The plastic compressor housing according to claim 4, wherein at least one second anchoring element is embodied on at least one third surface of the first housing part, of the second housing part, of at least one of the first individual element, of the second individual element, of the third individual element and/or of the fourth individual element, and/or of the thermoset body, and wherein at least one fourth surface of the second anchoring element is covered, at least in some areas, by the thermoplastic or the thermoplastic body.

6. The plastic compressor housing according to claim 3, wherein during the coating of the first housing part and of the second housing part with the thermoset body, the first housing part, the second housing part, at least one of the first individual element, the second individual element, the third individual element, and the fourth individual element, the thermoplastic body, and/or the thermoset body, at least in part, is or are covered by at least one thermoplastic in a hood-like manner.

7. The plastic compressor housing according to claim 3, wherein the first housing part, the second housing part, at least one of the first individual element, the second individual element, the third individual element and/or the fourth individual element, the thermoset body, the thermoplastic body, and/or the thermoplastic, at least in some areas, provides or provide at least one fluid intake port, at least one compressor channel, and/or, at least in some areas, at least one fluid outlet port.

8. The plastic compressor housing according to claim 7, further comprising at least one first fluid guide element comprising at least one fluid filter element, at least one line element, and/or at least one damping element,
    wherein the first fluid guide element is connected to the fluid intake port, to the compressor channel, and/or to the fluid outlet port, and is covered at least in some areas by the thermoplastic body or the thermoplastic,
    wherein at least one third anchoring element is embodied on at least one fifth surface, covered by the thermoplastic body or the thermoplastic, at least in some areas, of the first fluid guide element, and
    wherein at least one surface of the fluid intake port, of the compressor channel, and/or of the fluid outlet port, covered by the thermoplastic, at least in some areas, forms the first surface.

9. The plastic compressor housing according to claim 8, wherein the first fluid guide element comprises, at least in some areas, a plastic and/or a metal.

10. The plastic compressor housing according to claim 8, wherein the first housing part, the second housing part, at least one of the first individual element, the second individual element, the third individual element, and/or the fourth individual element, the thermoset body, the thermoplastic body, the thermoplastic, and/or the first fluid guide element is or are connected to at least one third housing part.

11. The plastic compressor housing according to claim 10, further comprising at least one first sealing element comprised by the first housing part, at least one second sealing element comprised by the second housing part, at least one third sealing element comprised by the third housing part, at least one fourth sealing element comprised by the first individual element, at least one fifth sealing element comprised by the second individual element, at least one sixth sealing element comprised by the third individual element, and/or at least one seventh sealing element comprised by the fourth individual element,
    wherein the first sealing element, the second sealing element, the third sealing element, the fourth sealing element, the fifth sealing element, the sixth sealing element, and/or the seventh sealing element is or are arranged, at least in part, in the area of at least one contact area of the first housing part, of the second housing part, of the third housing part, of the first individual element, of the second individual element, of the third individual element, and/or of the fourth individual element, with the first housing part, the second housing part, the third housing part, the first individual element, the second individual element, the third individual element, the fourth individual element, the thermoset body, the thermoplastic body, and/or the thermoplastic.

12. The plastic compressor housing according to claim 11, wherein the first sealing element, the second sealing element, the third sealing element, the fourth sealing element, the fifth sealing element, the sixth sealing element, and/or the seventh sealing element comprises or comprise at least one O-ring and/or at least one sealing compound in at least one recess.

13. The plastic compressor housing according to claim 10, wherein the first housing part, the second housing part, and/or the third housing part, at least in part, comprises, at least in some areas, the fluid intake port, at least one first connecting element for connecting at least one second fluid guide element to the fluid intake port, at least in some areas, the fluid outlet port, at least one second connecting element for connecting at least one third fluid guide element to the fluid outlet port, at least one connecting line in fluid connection with the fluid intake port, the compressor channel, and/or the fluid outlet port, and/or at least one valve device in active connection with the connecting line comprising at least one control capsule for controlling a pressure within the compressor.

14. The plastic compressor housing according to claim 13, wherein the connecting line provides an at least indirect fluid connection between the fluid intake port and the fluid outlet port, the compressor channel and the fluid intake port, the compressor channel and the fluid outlet port, and/or an ambient atmosphere on the one hand, and the fluid intake port, the compressor channel, and/or the fluid outlet port on the other hand, wherein the connection is controllable and/or can be regulated by the valve device in the form of an ambient-air pulsed valve.

15. The plastic compressor housing according to claim 10, wherein the third housing part comprises, at least in some areas, a glass fiber reinforced thermoplastic material and/or thermoset material.

16. The plastic compressor housing according to claim 10, wherein the third housing part is connected to the first housing part, the second housing part, at least one of the first individual element, the second individual element, the third individual element, and/or the fourth individual element, the thermoset body, the thermoplastic body, and/or the thermoplastic by way of at least one third connecting element.

17. The plastic compressor housing according to claim 16, wherein the third connecting element comprises at least one second recess embodied in the first housing part, the second housing part, at least one of the first individual element, the second individual element, the third individual element, and/or the fourth individual element, the thermoset body, the thermoplastic body, and/or the thermoplastic, and wherein at least one area of the third housing part is accommodated in the second recess, whereby the second recess corresponds to the first recess.

18. The plastic compressor housing according to claim 16, wherein the third connecting element comprises at least one first fastening means embodied in the first housing part, the second housing part, at least one of the first individual element, the second individual element, the third individual element, and the fourth individual element, the thermoset body, the thermoplastic body, and/or the thermoplastic,
wherein at least one fastening element is connected to the first fastening means, and
wherein the third housing part comprises a second fastening means that is connected to the fastening element.

19. The plastic compressor housing according to claim 18, wherein the first fastening means comprises at least one first opening and/or a first holder in the first housing part, the second housing part, at least one of the first individual element, the second individual element, the third individual element, and/or the fourth individual element, the thermoset body, the thermoplastic body, and/or thermoplastic, and wherein the second fastening means comprises a second opening aligned with the first opening and/or a second holder in the third housing part, wherein the fastening element can be inserted at least in some areas into the first opening and the second opening, wherein the first and/or the second opening and/or the first and/or the second holder comprises or comprise at least one bore, at least one hole, at least one blind hole and/or at least one thread, and/or the fastening element comprises at least one threaded connection, wherein the thread is embodied by the fastening element in the form of a thread-cutting screw.

20. The plastic compressor housing according to claim 18, wherein the third housing part in the area of the first fastening means and/or the second fastening means is in direct contact with the first housing part, the second housing part, the first individual element, the second individual element, the third individual element, the fourth individual element, and/or the thermoset body.

21. The plastic compressor housing according to claim 16, wherein the first individual element and/or the second individual element is connected to at least one of the third individual element and/or the fourth individual element by way of at least one fourth connecting element.

22. The plastic compressor housing according to claim 21, wherein the first individual element and the second individual element are connected to one another by way of at least one fifth connecting element, and wherein the third individual element and the fourth individual element are connected to one another by way of at least one sixth connecting element.

23. The plastic compressor housing according to claim 22, wherein the fourth connecting element, the fifth connecting element, and/or the sixth connecting element comprises at least one threaded connection.

24. The plastic compressor housing according to claim 8, wherein the first anchoring element, the second anchoring element, and/or the third anchoring element comprises at least one recess in the form of at least one undercut and/or at least one groove, at least one raised area, at least one web, at least one surface area with an increased surface roughness compared to the remaining first, second, third, and/or fourth surface, and/or at least one perforation of the first, second, third, and/or fourth surface,
wherein the recess and/or the perforation is filled substantially completely with the thermoset body, the thermoplastic body, and/or the thermoplastic, the web is covered substantially on all sides by the thermoset body, the thermoplastic body, and/or the thermoplastic, and/or the surface area is covered substantially completely by the thermoset body, the thermoplastic body, and/or the thermoplastic.

25. The plastic compressor housing according to claim 7, wherein at least one first recess is embodied in the first housing part, the second housing part, at least one of the first individual element, the second individual element, the third individual element, and the fourth individual element, and/or the thermoset body, and
wherein at least one wall of the first recess facing the compressor channel is covered, at least in some areas, with the thermoplastic or the thermoplastic body.

26. The plastic compressor housing according to claim 25, wherein the first recess is arranged, at least in some areas, adjacent to the compressor channel and/or, at least in some areas, between the compressor channel and the fluid intake port.

27. A method for producing a plastic compressor housing according to claim 1, comprising:
providing the at least one first housing part and the at least one second housing part;
arranging at least the individual elements of the first housing part relative to one another to form the first housing part or the individual elements of the second housing part relative to one another to form the second housing part,
wherein the first housing part and the second housing part are arranged relative to one another and the first and second housing part and the individual elements are connected to one another by coating the first housing part and the second housing part with at least one thermoset body or at least one thermoplastic body.

28. The method according to claim 27, wherein the first housing part, the second housing part, at least one individual element, the thermoplastic body, and/or the thermoset body is or are covered, at least in part, with at least one thermoplastic in a hood-like manner by coating with the thermoset body, wherein at least one wall of at least one recess embodied in the first housing part, the second housing part, and/or at least one individual element is covered, at least in some areas, with the thermoplastic.

29. The method according to claim 28, wherein at least one third housing part is connected by way of at least one fastening element to the first housing part, the second housing part, at least one individual element, the thermoplastic body, and/ or the thermoset body, and wherein the third housing part is accommodated at least in some areas in at least one second recess.

30. The method according to claim 29, wherein at least one first sealing element is embodied in the first housing part, at least one second sealing element is embodied in the second housing part, at least one third sealing element is embodied in the third housing part, and/or at least one fourth sealing element is embodied in at least one individual element.

31. The method according to claim 27, wherein at least one first anchoring element is embodied on at least one first surface and/or in the area of at least one end edge of the first housing part, the second housing part, and/or at least one individual element during the production of the first housing part, the second housing part, and/or the individual element, wherein at least one second surface of the first anchoring element is covered, at least in some areas, by the thermoset body or the thermoplastic body.

32. The method according to claim 31, wherein at least one second anchoring element is embodied on at least one third surface of the first housing part, the second housing part, and/or the thermoset body, wherein at least one fourth surface of the second anchoring element is covered, at least in some areas, by the thermoplastic body or the thermoplastic.

33. The method according to claim 27, wherein at least one first fluid guide element is connected to at least one fluid intake port, at least one compressor channel, and/or at least one fluid outlet port of the plastic compressor housing, wherein the first fluid guide element is covered, at least in some areas, by the thermoplastic body or the thermoplastic.

34. The method according to claim 27, further comprising connecting the first housing part and the second housing part to one another by way of at least one fourth connecting element, connecting at least two individual elements of the first housing part to one another by at least one fifth connecting element, and connecting at least two individual elements of the second housing part and/or at least one individual element of the first housing part and at least one individual element of the second housing part to one another, before coating with the thermoset body, the thermoplastic body, and/or the thermoplastic.

35. A turbocharger comprising a plastic compressor housing, wherein the plastic compressor housing comprises:
  at least one first housing part; and
  at least one second housing part,
  wherein the first housing part and the second housing part respectively comprise, at least in some areas, at least one thermoset material,
  wherein at least one of the first housing part and the second housing part comprises at least two individual elements, and
  wherein the first housing part and the second housing part are coated, at least in some areas, with at least one thermoset body or at least one thermoplastic body such that the first housing part, the second housing part, and the individual elements of the first housing part or the second housing part, respectively, are in contact at least in some areas with the thermoset body or the thermoplastic body.

36. A plastic compressor housing for a turbocharger, comprising:
  at least one first housing part; and
  at least one second housing part,
  wherein the first housing part and the second housing part respectively comprise, at least in some areas, at least one thermoset material,
  wherein at least one of the first housing part and the second housing part comprises at least two individual elements,
  wherein at least two of the first housing part, the second housing part and the two individual elements are at least in some areas arranged to form at least one edge-to-edge connection, and
  wherein the edge-to-edge connection is coated, at least in some areas, with at least one thermoplastic body.

* * * * *